US012624143B2

(12) United States Patent
Baig et al.

(10) Patent No.: US 12,624,143 B2

(45) Date of Patent: May 12, 2026

(54) POLYAMIDE-FUNCTIONALIZED SILICON CARBIDE (SiC) NANOPARTICLES-BASED CERAMIC MEMBRANE FOR SEPARATING AN OIL AND WATER MIXTURE

(71) Applicant: KING FAHD UNIVERSITY OF PETROLEUM AND MINERALS, Dhahran (SA)

(72) Inventors: Umair Baig, Dhahran (SA); Abdul Waheed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 357 days.

(21) Appl. No.: 18/327,240

(22) Filed: Jun. 1, 2023

(65) Prior Publication Data

US 2024/0400741 A1 Dec. 5, 2024

(51) Int. Cl.

*B01D 17/02* (2006.01)

*B01D 67/00* (2006.01)

(Continued)

(52) U.S. Cl.

CPC ............ *C08F 292/00* (2013.01); *B01D 17/02* (2013.01); *B01D 67/00793* (2022.08);

(Continued)

(58) Field of Classification Search

CPC ............ C08F 292/00; B01D 67/00793; B01D 71/0215; B01D 71/02; B01D 71/025;

(Continued)

(56) References Cited

U.S. PATENT DOCUMENTS

2018/0169588 A1* 6/2018 Song ........................ C04B 41/87

FOREIGN PATENT DOCUMENTS

CN 113896556 A 1/2022

CN 113185268 B 4/2022

(Continued)

OTHER PUBLICATIONS

Baig, U., et al., "A simple approach to fabricate composite ceramic membranes decorated with functionalized carbide-derived carbon for oily wastewater treatment", Membranes, 12, 394. (Year: 2022).*

(Continued)

*Primary Examiner* — Benjamin L Lebron

(74) *Attorney, Agent, or Firm* — Oblon, McClelland, Maier & Neustadt, L.L.P.

(57) ABSTRACT

A ceramic membrane includes an alumina ($Al_2O_3$) layer; and a polyamide nanocomposite layer at least partially covering a surface of the alumina layer. The polyamide nanocomposite layer contains polyamide-functionalized silicon carbide (SiC) nanoparticles having an average particle size of 0.1 to 1 micrometer (μm), an amine-functionalized SiC moiety, an acyl aryl moiety, and a piperazine moiety. The amine-functionalized SiC moiety contains a SiC core and an amine functionalized silicon dioxide ($SiO_2$) shell covering the SiC core. The amine-functionalized SiC moiety is covalently bonded to the piperazine moiety via the acyl aryl moiety; and the amine functionalized $SiO_2$ shell contains at least one amino group containing structural unit that is covalently bonded to the $SiO_2$ shell.

12 Claims, 22 Drawing Sheets

(51) Int. Cl.

| | |
|---|---|
| ***B01D 71/02*** | (2006.01) |
| ***B01D 71/56*** | (2006.01) |
| ***B01D 71/62*** | (2006.01) |
| ***C02F 1/40*** | (2023.01) |
| ***C02F 1/44*** | (2023.01) |
| ***C02F 101/32*** | (2006.01) |
| ***C08F 292/00*** | (2006.01) |

(52) U.S. Cl.
CPC ....... *B01D 71/0215* (2022.08); *B01D 71/025* (2013.01); *B01D 71/56* (2013.01); *B01D 71/62* (2013.01); *C02F 1/40* (2013.01); *C02F 1/44* (2013.01); *B01D 2323/216* (2022.08); *C02F 2101/32* (2013.01)

(58) Field of Classification Search
CPC .. B01D 71/56; B01D 71/62; B01D 2323/216; B01D 17/02; C02F 1/40; C02F 1/44; C02F 2101/32
See application file for complete search history.

(56) References Cited

FOREIGN PATENT DOCUMENTS

| | | | |
|---|---|---|---|
| WO | 2015/113106 | A2 | 8/2015 |
| WO | 2018/005595 | A1 | 1/2018 |
| WO | 2020/247472 | A1 | 12/2020 |

OTHER PUBLICATIONS

He, Y., et al., "Synthesis and characterization of functionalized silica-coated Fe3o4 superparamagnetic nanocrystals for biological applications", J Phys. D.: Appl. Phys., 38, 1342-1350. (Year: 2005).*

Kim et al. ; Processing of alumina-coated glass-bonded silicon carbide membranes for oily wastewater treatment ; International Journal of Applied Ceramic Technology, vol. 14, Issue 4 ; May 4, 2017 ; 2 Pages ; Abstract Only.

Habibi et al. ; Application of novel functionalized Al2O3/silica by organosiloxane and amine reagents for enhanced oil recovery ; Applied Nanoscience 10 ; Apr. 2, 2020 ; 2 Pages ; Abstract Only.

* cited by examiner $NH_2$-$SiO_2$@SiC

PIP

TPC

POLYAMIDE-FUNCTIONALIZED SILICON CARBIDE (SiC) NANOPARTICLES-BASED CERAMIC MEMBRANE FOR SEPARATING AN OIL AND WATER MIXTURE

STATEMENT REGARDING PRIOR DISCLOSURE BY THE INVENTORS

Aspects of this technology are described in "Facile fabrication of ceramic-polymeric nanocomposite membrane with special surface wettability using amino decorated $NH_2$—$SiO_2$@SiC nanopowder for production of clean water from oily wastewater," Process Safety and Environmental Protection, Volume 171, 694-704, which is incorporated herein by reference in its entirety.

STATEMENT OF ACKNOWLEDGEMENT

This research was supported by the Interdisciplinary Research Center for Membranes and Water Security under the project INMW2207 at King Fahd University of Petroleum and Minerals (KFUPM), Saudi Arabia.

BACKGROUND

Technical Field

The present disclosure is directed to a ceramic membrane, particularly a polyamide-functionalized silicon carbide (SiC) nanoparticles-based ceramic membrane for separating an oil and water mixture.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Oily wastewaters from industrial processes contain oil in three forms: floated and dispersed oil (which accounts for approximately 90% of the oil content by weight), emulsified oil (about 10% by weight), and dissolved oil (only 0.5% by weight). The removal of floated and dispersed oil droplets is easier as their larger size (>10 μm) allows for mechanical removal. On the other hand, separating emulsified oil from oily wastewaters is extremely difficult due to the presence of emulsifiers that reduce the surface tension between the oil and water interface, making separation challenging. Emulsified oil, also known as oil-in-water (O/W) emulsion, is produced by several industries, including oil and gas, oil transportation and refining, cosmetics, and textiles. Conventional treatment methods for O/W emulsions include dissolved air flotation, coalescence separation, and gravity separation. However, these methods are often inefficient, particularly when the emulsifiers completely emulsify the oil droplets.

Membrane-based technologies have been developed to tackle the challenge of treating the large volume of oily wastewater generated by the oil and gas industry. Ultrafiltration polymeric membranes have been developed for oil/water separation. However, polymeric membranes are susceptible to fouling, as oil can deposit on their surfaces. Superhydrophilic/superoleophilic membranes have been developed with fine-tuned wettability features. A chitosan-based membrane prepared by incorporating UiO-66-$NH_2$ in the membrane is known. The membrane, after incorporation of UiO-66-$NH_2$, showed improved performance compared to the unmodified membrane. Polymeric membranes, however, often exhibit reduced chemical and thermal stability when used in real-world industrial processes for separating oil form oil-in-water (O/W) emulsion.

Due to the stability of ceramic membranes under experimental and real-world oil-in-water (O/W) emulsion separation conditions, ceramic membranes, such as silica ($SiO_2$), alumina ($Al_2O_3$), Zirconia ($ZrO_2$), and titania ($TiO_2$), have emerged as an attractive alternative to polymeric membranes. Despite their stability, ceramic membranes are prone to two types of fouling: reversible and irreversible. The reversible fouling is due to the deposition of foulants on the membrane surface followed by penetration of foulants in the membrane's pores, which results in blockage of the pore, leading to blockage of membrane pores. The blockage of the pores leads to a considerable decline in permeate flux. The reversible fouling can be removed by hydraulic washing, such as a back flush or cross flush. Conversely, irreversible fouling is challenging to be removed by simple hydraulic washing because the foulants are tightly bound to the membrane surface. Hence, chemical cleaning is carried out to restore the membrane performance, which may damage the membrane integrity and reduces the life span of the ceramic membranes. A combination of humic acid and Bovine serum albumin (BSA) model foulants caused irreversible fouling of the $ZrO_2$@$TiO_2$ membrane (Munla, L., Peldszus, S., Huck, P. M., 2012. Reversible and irreversible fouling of ultrafiltration ceramic membranes by model solutions. J. Am. Water Works Assoc. 104, E540-E554).

In addition to the oil present in O/W emulsions, the other components also contribute to membrane fouling. Emulsion-stabilizing surfactants, for instance, have been found to affect the fouling profile of the membranes. The surfactant charge was found to play a crucial role in controlling membrane fouling. It was found that the surfactant with an opposite charge to the membrane surface reduces the membrane fouling. This may be attributed to the demulsification of the smaller oil droplets into bigger-sized oil drops, which are relatively easy to remove from O/W emulsion (Lu, D., Zhang, T., Ma, J., 2015. Ceramic membrane fouling during ultrafiltration of oil/water emulsions: Roles played by stabilization surfactants of oil droplets. Environ. Sci. Technol. 49, 4235-4244). Therefore, proper tuning and engineering of the membrane surface features are of utmost importance for controlling membrane fouling and enhancing the performance and lifespan of the membrane.

The membrane surfaces have been developed to have certain special wettability (wetting/non-wetting) features, such as superoleophilic (oil contact angle; $\theta=\leq 5°$) and superhydrophobic (water contact angle; $\theta=\geq 150°$) membranes. Such membranes allow oil to pass through due to superoleophilicity, while the membrane rejects water due to its hydrophobic surface (Rasouli, S., Rezaei, N., Hamedi, H., Zendehboudi, S., Duan, X., 2021. Superhydrophobic and superoleophilic membranes for oil-water separation application: A comprehensive review. Mater. Des. 204, 109599). On the other hand, superhydrophilic (water contact angle; $\theta=\leq 5°$) and superoleophobic (oil contact angle; $\theta=\geq 150°$) membranes allow water to pass while oil is rejected by the membrane (Zarghami, S., Mohammadi, T., Sadrzadeh, M., van der Bruggen, B., 2019. Superhydrophilic and underwater superoleophobic membranes-A review of synthesis methods. Prog. Polym. Sci. 98, 101166). However, long-term exposure of such membranes to O/W emulsion leads to membrane fouling due to oil depositing on the membrane surface. Therefore, a modified surface wettability has been developed for the treatment of oily wastewater where the membrane is both superhydrophilic (in the air with a water contact angle; θ=≤5°) and superoleophilic in the air (in the air with an oil contact angle; θ=≤5°) while the membrane is superoleophobic underwater (underwater oil contact angle; θ=≥150°). The underwater superoleophobicity establishes a thin film of water that repels the oil, and the evidence of membrane fouling is minimized. In this modified surface wettability condition, water permeates through the membrane because of the super-hydrophilic nature of the membrane while repelling oil due to its underwater superoleophobicity.

Materials have been explored for their potential in the separation of O/W emulsion, which includes nanomaterials, meshes, and other additives. Silicon carbide (SiC) is a porous material with intrinsic superhydrophilic and underwater superoleophobic nature (Jiang, Q., Wang, Y., Xie, Y., Zhou, M., Gu, Q., Zhong, Z., Xing, W., 2022. Silicon carbide microfiltration membranes for oil-water separation: Pore structure-dependent wettability matters. Water Res. 216, 118270). The hydrophilicity of SiC is more than the other metal oxides used in ceramic membranes. The SiC membranes have shown consistent permeability and superior anti-fouling properties under filtration conditions where oily wastewater has been used as a feed (Chen, M., Heijman, S. G. J., Luiten-Olieman, M. W. J., Rietveld, L. C., 2022. Oil-in-water emulsion separation: Fouling of alumina membranes with and without a silicon carbide deposition in constant flux filtration mode. Water Res. 216, 118267).

Previous attempts to develop SiC membranes for O/W emulsion separation have faced challenges due to high fabrication costs and extreme operating conditions, such as high sintering temperatures, which make them unfeasible for industrial applications. Surface modification has emerged as an alternative strategy for fabricating high-performance ceramic membranes by functionalizing the membrane with appropriate agents to create a superoleophobic and superhydrophilic surface. However, many of the strategies proposed in the literature involve physical mixing of additives in the membrane, which can be easily washed out during real filtration conditions, limiting their effectiveness.

In view of the foregoing, one objective of the present disclosure is to provide a ceramic membrane that can overcome the limitations described above. A second objective of the present disclosure is to describe a method of making the ceramic membrane. A third objective of the present disclosure is to describe a method of separating oil from an oil-containing liquid mixture.

SUMMARY

In an exemplary embodiment, a ceramic membrane, is described. The ceramic membrane includes an alumina ($Al_2O_3$) layer, and a polyamide nanocomposite layer at least partially covering a surface of the alumina layer. In some embodiments, the polyamide nanocomposite layer contains polyamide-functionalized silicon carbide (SiC) nanoparticles having an average particle size of 0.1 to 1 micrometer (μm)

In some embodiments, the polyamide-functionalized SiC nanoparticles contains an amine-functionalized SiC moiety, an acyl aryl moiety, and a piperazine moiety. In some embodiments, the amine-functionalized SiC moiety contains a SiC core and an amine-functionalized silicon dioxide ($SiO_2$) shell covering the SiC core. In some embodiments, the amine-functionalized SiC moiety is covalently bonded to the piperazine moiety via the acyl aryl moiety. In some embodiments, the amine-functionalized $SiO_2$ shell has at least one amino group containing structural unit that is covalently bonded to the $SiO_2$ shell.

In some embodiments, the polyamide-functionalized SiC nanoparticles have a structure of formula I, Formula [I]

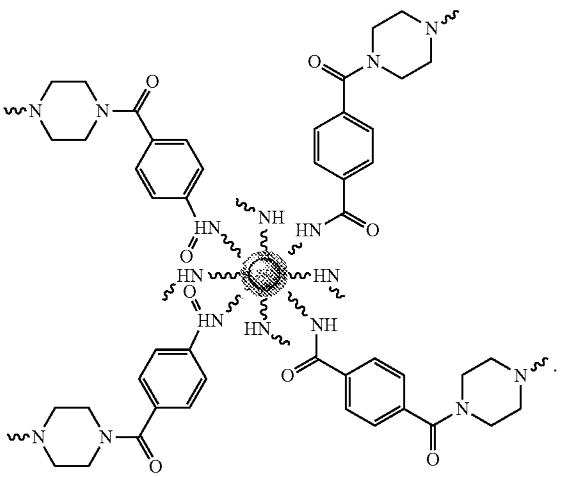

In some embodiments, the at least one amino group containing structural unit has a formula (II)

Formula [II]

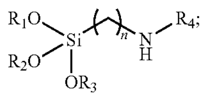

wherein $R_1$, $R_2$, $R_3$, and $R_4$ are each independently selected from the group consisting of hydrogen, an optionally substituted alkyl, and an optionally substituted cycloalkyl; and wherein n is any integer from 1 to 12 inclusive.

In some embodiments, the membrane has a permeate flux of up to 350 liters per square meter per hour (L/m$^2$·h) under a pressure of 0.1 to 4 bar at a thickness of up to 300 μm.

In some embodiments, the membrane has a water contact angle less than or equal to 5 degrees (°).

In some embodiments, the membrane has an oil contact angle greater than or equal to 150°.

In some embodiments, a method of making a ceramic membrane is described. The method includes calcining silicon carbide particles at a temperature of 600 to 800 degree Celsius (° C.) in the presence of oxygen to form a first composite having a silicon carbide core surrounded by a silicon dioxide shell; dispersing the first composite in an alcohol solvent and mixing with an aminosilane compound to form a second composite; washing the second composite and drying to form an amine-functionalized silicon carbide composite; mixing the amine-functionalized silicon carbide composite and a piperazine-containing solution to form a dispersion; dipping the alumina layer into a surfactant solution to form a treated alumina layer; passing the dispersion through the treated alumina layer to from an impregnated alumina layer containing the amine-functionalized silicon carbide composite particles and piperazine molecules; and dipping the impregnated alumina layer in an acyl aryl chloride solution and reacting to form the polyamide nanocomposite layer covering the surface of the alumina layer thereby forming the ceramic membrane.

In some embodiments, the alcohol solvent includes at least one of isopropanol, ethanol, and methanol.

In some embodiments, the aminosilane compound includes at least one of N-(6-aminohexyl)aminomethyltriethoxysilane, bis(3-triethoxysilylpropyl)amine, 3-aminopropyl(diethoxy)methylsilane, 3-Aminopropyltrimethoxysilane (APTMS), and 3-aminopropyltriethoxysilane (APTES).

In some embodiments, the first composite is present in the alcohol solvent at a concentration of 5 to 20 milligrams per milliliter (mg/mL).

In some embodiments, the aminosilane compound is present in the alcohol solvent at a concentration of 1 to 10 vol. % based on a total volume of the alcohol solvent.

In some embodiments, the amine-functionalized silicon carbide composite has an average particle size in a range of 20 to 600 nanometers (nm).

In some embodiments, the amine-functionalized silicon carbide is present in the dispersion at a concentration of 0.01 to 0.5 g/mL based on a total volume of the dispersion.

In some embodiments, the piperazine is present in the piperazine-containing solution at a concentration of 0.5 to 5 g/mL based on a total volume of the piperazine-containing solution.

In some embodiments, the surfactant solution comprises at least one surfactant selected from the group consisting of sodium dodecyl sulfate (SDS), sorbitan monolaurate, and dodecyltrimethylammonium bromide.

In some embodiments, the treated alumina layer formed the surfactant solution is placed on a support disc in a dead end filtration cell. In some embodiments, the dead end filtration cell is in the shape of a vertical cylinder having a gas inlet, a permeate outlet, a top portion, a body portion, and a bottom portion. In some embodiments, the gas inlet is located on the outer surface of the top portion. In some embodiments, the permeate outlet is located on the outer surface of the bottom portion. In some embodiments, the top portion is in fluid communication with the bottom portion via the body portion of the dead end filtration cell. In some embodiments, the bottom portion comprises the support disc and a cell bottom. In some embodiments, the support disc is above and adjacent to the cell bottom.

In some embodiments, the acyl aryl chloride is present in the acyl aryl chloride solution at a concentration of 0.05 to 0.5 gram per milliliter (g/mL) based on a total volume of the acyl aryl chloride solution.

In some embodiments, the acyl aryl chloride includes at least one selected from the group consisting of terephthalyol chloride, phthaloyl dichloride, and isophthaloyl dichloride.

In some embodiments, a method of separating oil from an oil-containing liquid mixture, is described. The method includes contacting the oil-containing liquid mixture with the ceramic membrane to form a purified aqueous composition by rejecting the oil and allowing the oil-containing liquid mixture to pass through the membrane.

In some embodiments, the oil is present in the oil-containing liquid mixture at a concentration of up to 300 ppm having a separation efficiency of at least 90% based on an initial oil concentration in the oil-containing liquid mixture.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
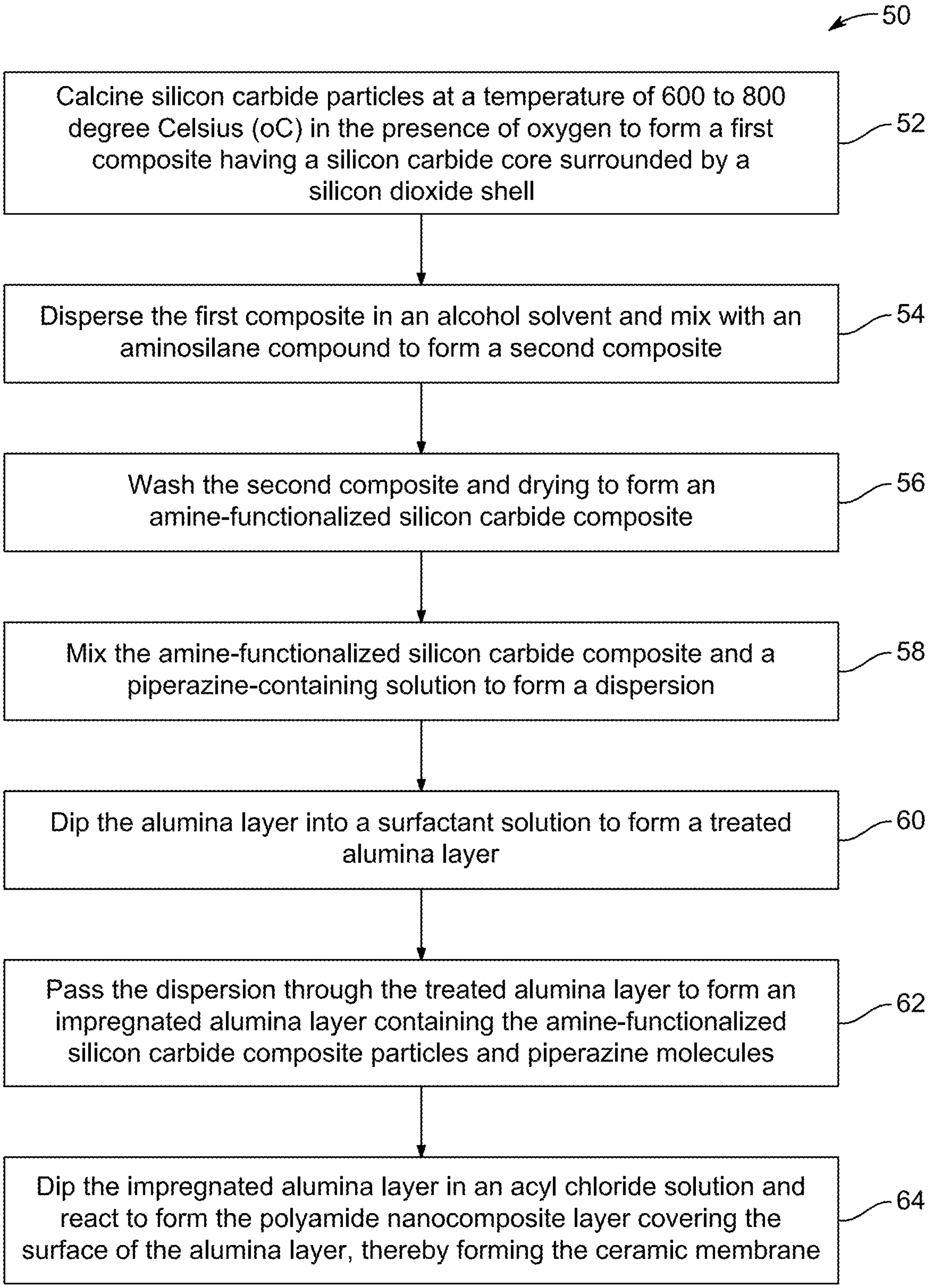
FIG. 1 is a flowchart depicting a method of making a ceramic membrane, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "solvent" will be well understood by the average skilled reader and includes an organic or aqueous liquid. It is understood that the term solvent also includes a mixture of solvents. Non-limiting examples of solvents include aromatics, alkanes, ketones, glycols, chlorinated solvents, esters, ethers, amines, nitriles, aldehydes, phenols, amides, carboxylic acids, alcohols, furans, and polar protic and polar aprotic solvents, water, and mixtures thereof. Specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methyl pyrrolidone, acetonitrile, water, and mixtures thereof.

As used herein, the term "alkyl" or "alkyl groups," as used herein, refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkylsubstituted alkyl groups (e.g., alkyl-substituted cycloalkyl groups and cycloalkyl-substituted alkyl groups). The term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "surfactant" generally refers to a substance that reduces the surface tension between two substances, such as a liquid and a solid or a liquid and a gas. In the present disclosure, surfactant may be an organic chemical that when added to a liquid changes the properties of that liquid at a surface.

A ceramic-polymeric membrane ($SiO_2$@SiC/PA@$Al_2O_3$) was fabricated by covalently decorating amino-functionalized silicon carbide ($NH_2$—$SiO_2$@SiC) as an active layer on an alumina support. The fabrication process involves three steps: (i): growing a layer of silicon dioxide ($SiO_2$) on silicon carbide (SiC), leading to silicon dioxide loaded silicon carbide ($SiO_2$@SiC); (ii) amino functionalization of the $SiO_2$@SiC using an aminosilane compound, yielding amino-functionalized silicon carbide ($NH_2$—$SiO_2$@SiC); and (iii) covalently crosslinking the $NH_2$—$SiO_2$@SiC on an active layer of the alumina support, by interfacial polymerization reaction (IP) to form the ceramic membrane.

According to an aspect of the present disclosure, a ceramic membrane is described. The ceramic membrane includes an alumina ($Al_2O_3$) layer; and a polyamide nanocomposite layer at least partially covering a surface of the alumina layer. The alumina layer includes $Al_2O_3$ particles generally used as membrane support due to advantages provided by this material and its derivatives, such as availability in tonnage quantities, chemical inertness, good hardness, and thermal stability of the porous texture during elaboration steps.

The alumina layer includes alumina particles in the form of nanocrystalline powders. In some embodiments, the alumina layer has a thickness range of 0.5 to 10 millimeters (mm), preferably 1 to 8 mm, preferably 2 to 6 mm, or even more preferably 3 to 4 mm. In a preferred embodiment, the alumina particles have an average size of 1 to 10 μm, preferably 2 to 8 μm, preferably 3 to 6 μm, or even more preferably about 5 μm. Other ranges are also possible. The alumina particles are dispersed to form a structure with pores having the largest dimension of 0.2 to 3 μm, preferably in a range of 1 to 2 μm, or even more preferably about 1.5 μm. The alumina particles in the alumina support may be similarly or differently sized. The alumina particles in the alumina layer may exist in different forms, such as alpha-alumina, delta-alumina, gamma-alumina, or combinations thereof, in the alumina support. In a preferred embodiment, the alumina support has alumina particles in a γ form. γ-$Al_2O_3$ is formed by heating boehmite AlO(OH) between 400 and 500° C. It has a specific surface area >100 $m^2$/g, preferably 100-300 $m^2$/g. Upon heating, adjacent OH groups can react to release water. The support may be adapted to form microfiltration, nanofiltration, or ultrafiltration support.

Optionally, the alumina support may include other particles such as titania ($TiO_2$), silica ($SiO_2$), zirconia ($SiO_2$), or a mixture of these materials. In some embodiments, the support may include a combination of these materials—for example, a $Al_2O_3$—$ZrO_2$ composite. In an embodiment, the alumina support may consist of one or more layers; each including alumina particles of different pore sizes. In an embodiment, each layer from one or more layers may be made of the same or different material. For example, a first layer may be made of $Al_2O_3$ material, while a second layer in the alumina support may be made up of $Al_2O_3$—$ZrO_2$. The alumina support may exist in different shapes-such as tubular, monolith, hollow fiber, and flat sheet.

The membrane includes at least one layer of polyamide nanocomposite layer that forms the active layer of the membrane. The active layer covers at least 50%, preferably 60%, more preferably 80%, and yet more preferably more than 95% of the alumina layer, each % based on a total surface area of one side of the alumina support. The polyamide nanocomposite layer includes polyamide (PA)-functionalized silicon carbide (SiC) nanoparticles having a structure of formula I, Formula [I]

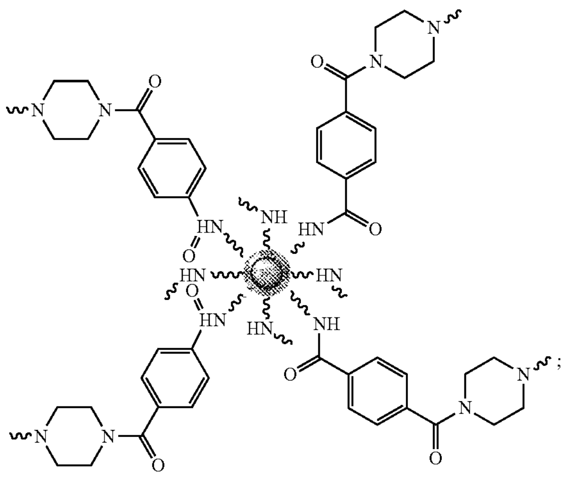

The polyamide-functionalized SiC nanoparticles include an amine-functionalized SiC moiety, an acyl aryl moiety, and piperazine. In some embodiments, the polyamide-functionalized SiC nanoparticles have an average particle size of 0.1 to 1 micrometer (μm), preferably 0.2 to 0.8 μm, preferably 0.3 to 0.6 μm, or even more preferably about 0.4 μm. Other ranges are also possible. The amine-functionalized SiC moiety includes a SiC core and an amine-functionalized silicon dioxide ($SiO_2$) shell covering the SiC core. SiC is available in many polymorphic forms, among which α and β polymorphic forms of SiC are known to those of skill in the art. In an embodiment, the amine-functionalized SiC moiety includes SiC particles in β phase. The SiC particles can be in a range of particle sizes; with an average particle size of less than 100 nm. The amine-functionalized silicon dioxide ($SiO_2$) shell includes one or more amino groups that are covalently bonded to the $SiO_2$ shell. In some embodiments, the amino group-containing structural unit has formula (II)

Formula [II]

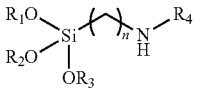

Wherein $R_1$, $R_2$, $R_3$, and $R_4$ are each independently selected from the group consisting of hydrogen, an optionally substituted alkyl, and an optionally substituted cycloalkyl; and wherein n is any integer from 1 to 12 inclusive. In some embodiments, the aminosilane compound having the amino group-containing structural unit includes at least one of N-(6-aminohexyl)aminomethyltriethoxysilane, bis(3-triethoxysilylpropyl)amine, 3-aminopropyl(diethoxy)methylsilane, 3-Aminopropyltrimethoxysilane (APTMS), and 3-aminopropyltriethoxysilane (APTES). In a preferred embodiment, the aminosilane compound is APTES. In some embodiments The amine-functionalized silicon carbide composite has an average particle size in a range of 20 to 600 nm. The amine-functionalized SiC moiety is covalently bonded to the piperazine moiety via the acyl aryl moiety. Suitable examples of acyl aryl moiety include acyl aryl chloride. The acyl aryl chloride includes at least one selected from the group consisting of terephthaloyl chloride, phthaloyl dichloride, and isophthaloyl dichloride. In a preferred embodiment, the acyl aryl chloride is terephthaloyl chloride. In some embodiments, the membrane may include additives that can enhance the compatibility between the alumina support and the polyamide-functionalized SiC nanoparticles.

A method for making the membrane is described. Referring to FIG. 1, a schematic flow diagram of a method of making the membrane is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

Figure 2:
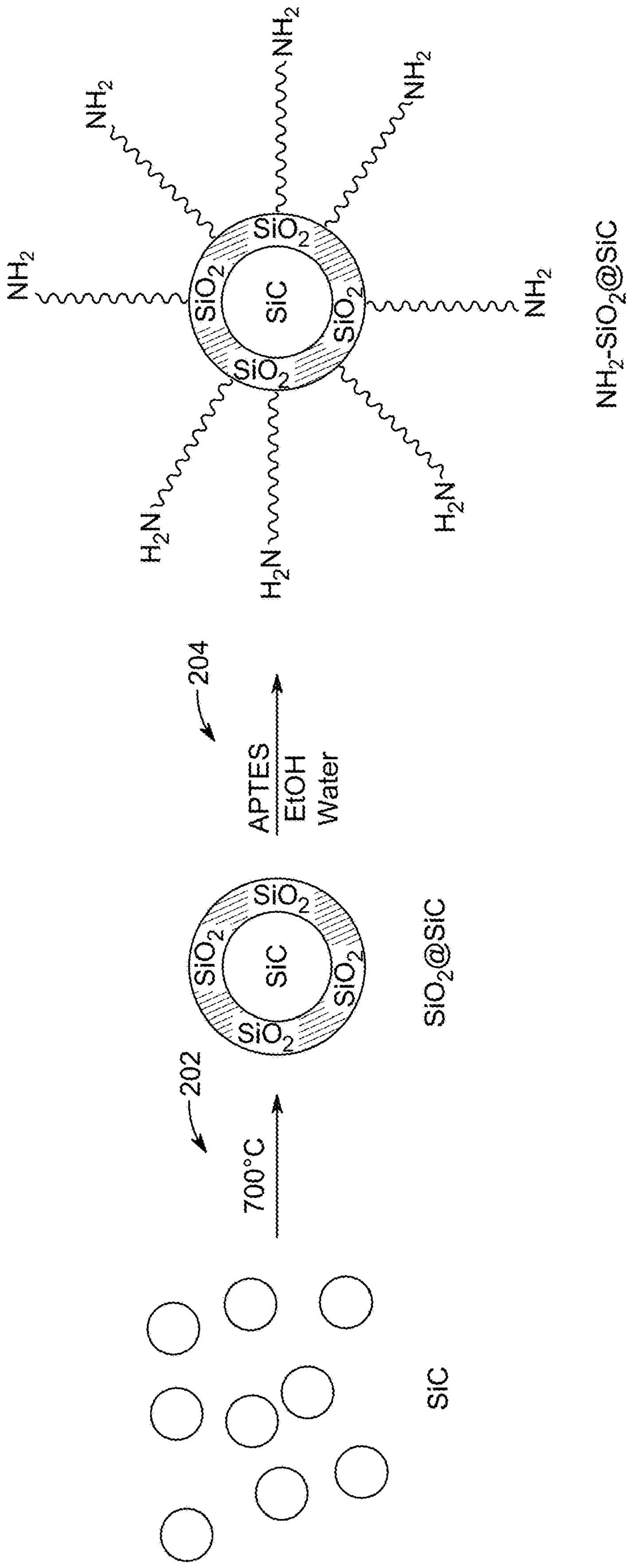
FIG. 2 is a schematic representation depicting a possible route for amino-functionalization of SiC leading to amino-functionalized silicon carbide ($NH_2$—$SiO_2$@SiC), according to certain embodiments.

At step 52, the method 50 includes calcining silicon carbide particles at a temperature of 600 to 800 degree Celsius (° C.), preferably 650 to 750° C., or even more preferably about 700° C., in the presence of oxygen to form a first composite having a silicon carbide core surrounded by a silicon dioxide shell, as depicted in FIG. 2. The silicon carbide particles may be procured commercially or can be synthesized by any of the conventional methods known in the art. The SiC particles may exist in various forms, such as nanowires, nanotubes, nanoneedle, nanobelts, nanocables, nanopowders, or a combination thereof; and may also exist in various crystalline phases, for example α- or β-SiC phase or mixtures of these or further SiC phases. A total of more than 150 polytype phases are generally known for SiC. In a preferred embodiment, the SiC nanoparticles are in β-phase. The SiC nanoparticles are preferably in the form nanopowders, with a particle size less than 100 nm. The calcination of SiC nanoparticles may be performed by placing the SiC nanoparticles into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In preferred embodiments, the SiC nanoparticles are heated with a heating rate in the range of 1 to 15° C./min, preferably 3 to 10° C./min, preferably 5 to 6° C./min to an elevated temperature described above, and the SiC nanoparticles are heated at such an elevated temperature (e.g., 700° C.) for 1 to 5 hours, preferably 2 to 4 hours, preferably 2 hours, to form the first composite. Generally, SiC is a highly oxidation-resistant material; however at defined reaction conditions and in the abundant supply of air (oxygen), the SiC nanopowders form a protective oxide film, due to passive oxidation of SiC, to form $SiO_2$. During the oxidation process, other compounds, such as CO, and SiO may be formed as well. The SiC forms the core, while the protective oxide film ($SiO_2$) forms the shell in the first composite. The first composite is otherwise referred to $SiO_2$@SiC.

At step 54, the method 50 includes dispersing the first composite in an alcohol solvent and mixing with an aminosilane compound to form a second composite, as depicted in FIG. 2. This step results in amino functionalization of $SiO_2$@SiC to form $NH_2$—$SiO_2$@SiC. To carry out the amino functionalization process, the first composite is initially dispersed in an alcohol solvent to form a solution. The first composite is present in the alcohol solvent at a concentration of 5 to 20 milligrams per milliliter (mg/mL), preferably 8 to 17 mg/mL, or even more preferably 11 to 14 mg/mL. Suitable examples of the alcohol solvent include one of isopropanol, ethanol, methanol, or a combination thereof. Next, to the solution was added an aminosilane compound for amino functionalization of $SiO_2$@SiC. Suitable examples of the aminosilane compound include at least one of N-(6-aminohexyl)aminomethyltriethoxysilane, bis(3-triethoxysilylpropyl)amine, 3-aminopropyl(diethoxy)methylsilane, 3-Aminopropyltrimethoxysilane (APTMS), and 3-aminopropyltriethoxysilane (APTES). In a preferred embodiment, the aminosilane compound is APTES. The aminosilane compound is present in the alcohol solvent at a concentration of 1 to 10 vol. % based on a total volume of the alcohol solvent, preferably 3 to 8 vol. %, or even more preferably about 5 vol. % based on the total volume of the alcohol solvent. Other ranges are also possible. The reaction was carried out for 18-36 hours, preferably 20-30 hours, more preferably for about 24 hours, under stirring to form the second composite.

At step 56, the method 50 includes washing the second composite and drying to form an amine-functionalized silicon carbide composite. The second composite was further washed with alcohol (preferably ethanol)/water, or mixtures thereof, to remove any unreacted reactants and impurities in the second composite. The alcohol was further evaporated from the second composite by drying to a temperature range of 40-60° C., preferably to about 50° C., to form a dried solid of the amino-functionalized silicon carbide composite (also referred to as $NH_2$—$SiO_2$@SiC). The dried solid is further ground into fine particles, using a mixer or a mortar and pestle, to form the $NH_2$—$SiO_2$@SiC. After grinding, the amine-functionalized silicon carbide composite has an average particle size in a range of 20 to 600 nm, preferably 60 to 500 nm, preferably 100 to 400 nm, preferably 140 to 300 nm, or even more preferably 180 to 200 nm. Other ranges are also possible.

Figure 3:
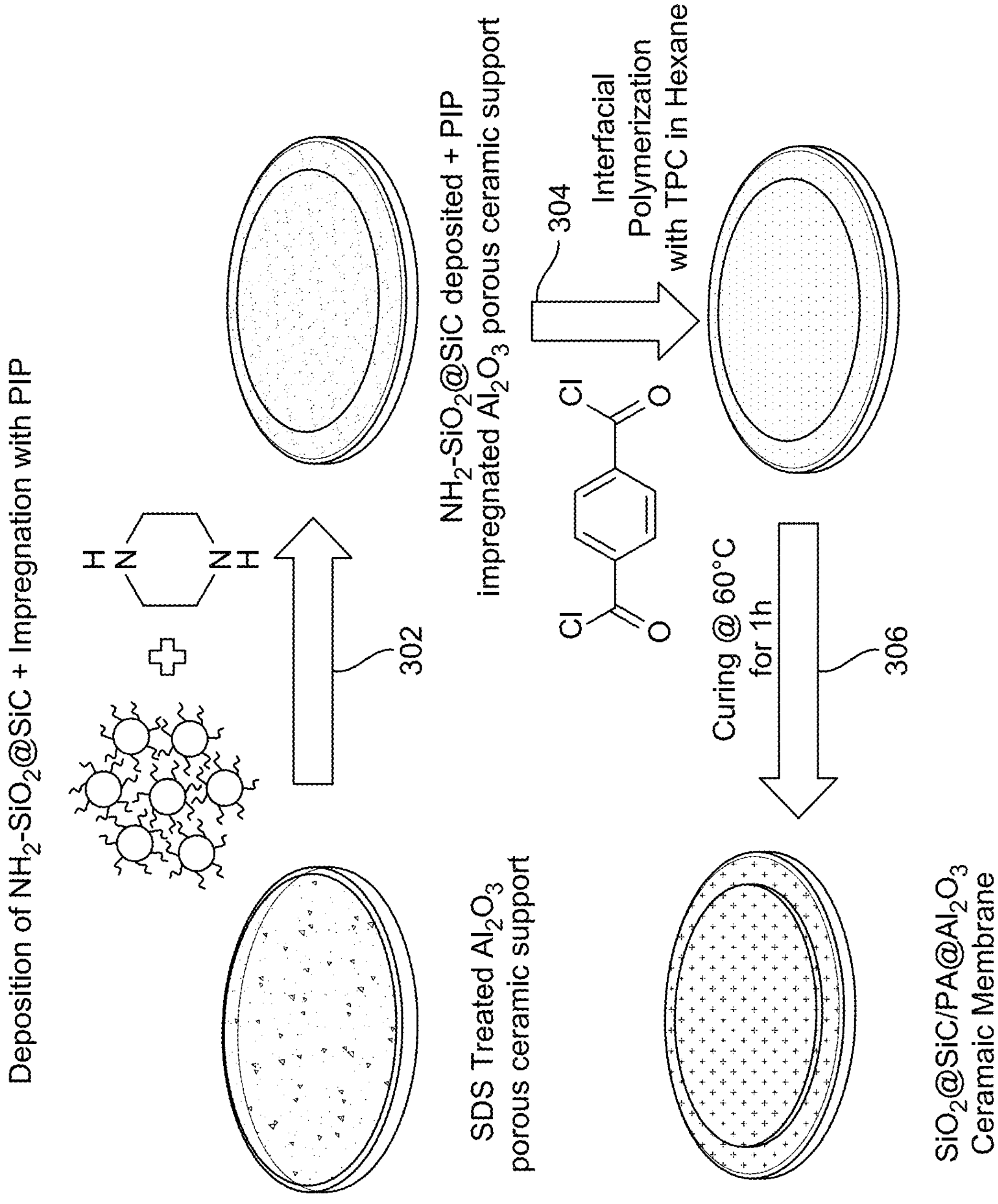
FIG. 3 is a schematic representation of the various steps adopted during fabrication of $SiO_2$@SiC/PA@$Al_2O_3$ ceramic membrane, according to certain embodiments.

At step 58, the method 50 includes mixing the amine-functionalized silicon carbide composite and a piperazine-containing solution to form a dispersion, as depicted in FIG. 3. The amine-functionalized silicon carbide is present in the dispersion at a concentration of 0.01 to 0.5 g/mL based on a total volume of the dispersion, preferably 0.1 to 0.4 g/mL, or even more preferably 0.2 to 0.3 g/mL based on the total volume of the dispersion. The piperazine containing solution includes an aqueous solution of piperazine. In some embodiments, the piperazine in the aqueous solution may be optionally substituted by an alkyl, aryl, or an amino group (for example: 3,5-diaminobenzoyl piperazine). The piperazine is present in the piperazine-containing solution at a concentration of 0.5 to 5 g/mL based on a total volume of the piperazine-containing solution, preferably 1 to 4 g/mL, or even more preferably 2 to 3 g/mL based on the total volume of the piperazine-containing solution. In some embodiments, other amines may be used instead of piperazine, or may be used in combination with piperazine, to form a dispersion. Suitable examples of amines include, m-phenylenediamine, ethylene diamine, $N^1$,$N^1$-dimethylpropan-1,3-diamine, $N^1$,$N^1$-diethylethane-1,2-diamine, diethylene triamine (DETA), melamine, tetra-ethylene pentaamine (TEPA), or a combination thereof.

At step 60, the method 50 includes dipping the alumina layer into a surfactant solution to form a treated alumina layer, as depicted in FIG. 3. To activate the alumina support and enhance the wettability of the membrane, the alumina support was immersed/dipped/soaked in the surfactant solution to form the treated alumina layer. In some embodiment, the surfactant solution is an aqueous solution of sodium dodecyl sulfate (SDS). In some embodiments, the concentration of the SDS in the aqueous solution is in a range of 0.05-30 wt. %, preferably 0.5-10 wt. % of the total weight of the aqueous solution. The immersion of the alumina support into the surfactant solution can be carried out at room temperature-preferably at a temperature range of 20-37° C. SDS is used as a wetting agent or a surfactant to enhance the wettability without altering the inherent characteristics of the alumina layer. In some embodiments, other surfactants that can improve the wettability of the alumina support may also be used—for example: sodium dodecyl benzenesulfonate (SDBS), cetyltrimethylammonium bromide (CTAB), sodium lauryl sulfate (SLS), sorbitan monolaurate, and dodecyl trimethylammonium bromide.

At step 62, the method 50 includes passing the dispersion through the treated alumina layer to form an impregnated alumina layer containing the amine-functionalized silicon carbide composite particles and piperazine molecules, as depicted in FIG. 3. To impregnate the alumina layer with the amine-functionalized silicon carbide composite particles and piperazine molecules, the treated alumina layer formed the surfactant solution is placed on a support disc in a dead-end filtration cell. The dead-end filtration cell is in the shape of a vertical cylinder having a gas inlet, a permeate outlet, a top portion, a body portion, and a bottom portion. The gas inlet is located on the outer surface of the top portion, and the permeate outlet is located on the outer surface of the bottom portion. The top portion is in fluid communication with the bottom portion via the body portion of the dead-end filtration cell. The bottom portion includes the support disc and a cell bottom; and the support disc is above and adjacent to the cell bottom.

Figure 4:
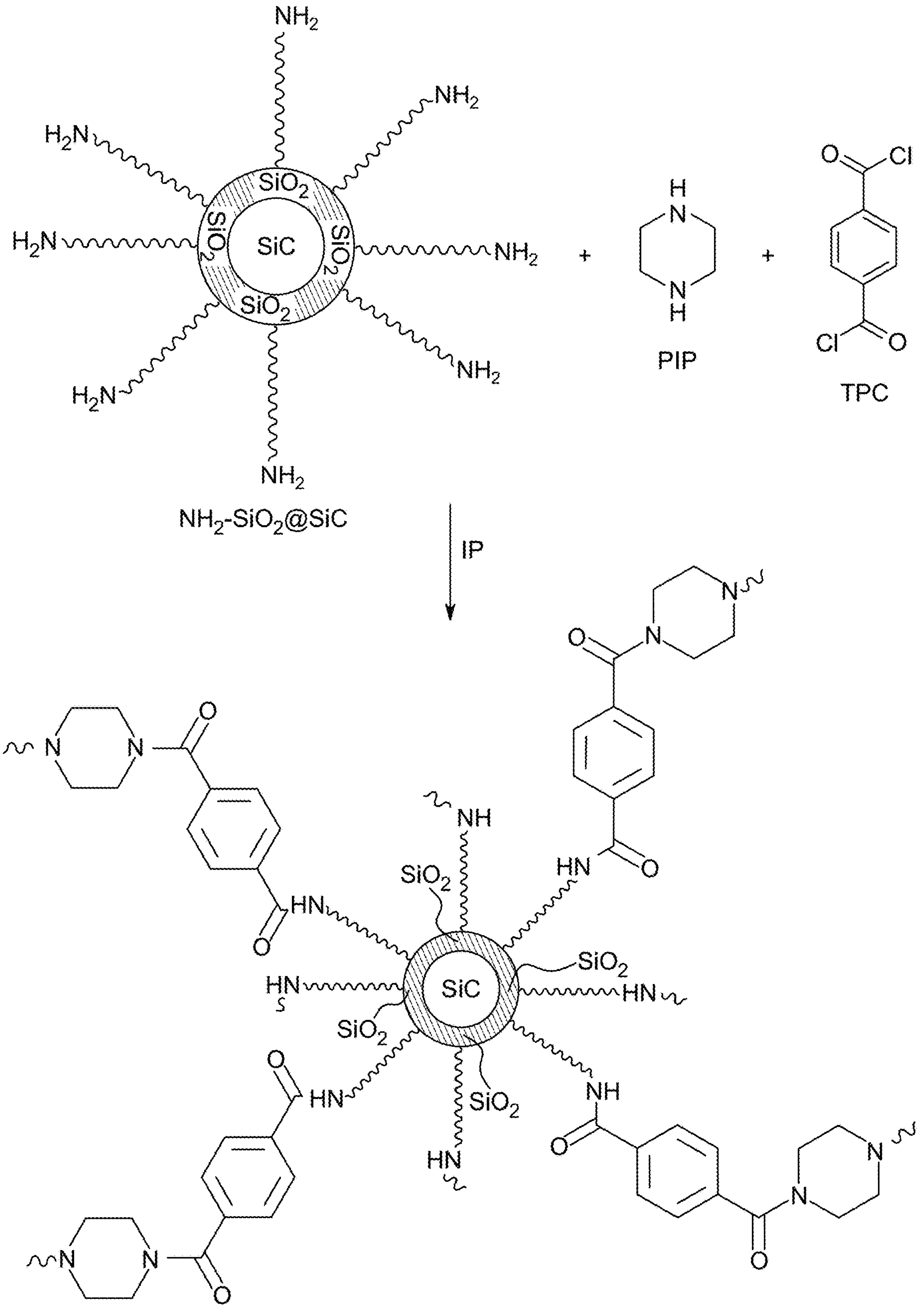
FIG. 4 is a schematic illustration depicting proposed interfacial polymerization (IP) reaction between —$NH_2$ groups of $NH_2$—$SiO_2$@SiC and —COCl group of terephthaloyl chloride (TPC) as a (crosslinker) in the presence of piperazine (PIP) as an extra secondary diamine and possible structure of $SiO_2$@SiC/PA active layer of $SiO_2$@SiC/PA@$Al_2O_3$ ceramic membrane, according to certain embodiments.

At step 64, the method 50 includes dipping the impregnated alumina layer in an acyl aryl chloride solution and reacting to form the polyamide nanocomposite layer covering the surface of the alumina layer thereby forming the ceramic membrane, as depicted in FIGS. 3 and 4. The acyl aryl chloride is present in the acyl aryl chloride solution at a concentration of 0.05 to 0.5 g/mL based on a total volume of the acyl aryl chloride solution, preferably 0.1 to 0.4 g/mL, or even more preferably 0.2 to 0.3 g/mL. Other ranges are also possible. The acyl aryl chloride comprises at least one selected from the group consisting of terephthaloyl chloride, phthaloyl dichloride, and isophthaloyl dichloride. the interfacial polymerization (IP) was carried out on the ultrafiltration support (prepared by phase inversion), PS/PET, using a linear cross-linker TPC dissolved in n-hexane. The IP reaction led to the formation of $NH_2$—$SiO_2$@SiC covalently decorated polyamide active layer of the membrane, as depicted in FIG. 4.

The ceramic membrane prepared by the method of the present disclosure has a permeate flux of up to 350 liters per square meter per hour (L/$m^2$·h), preferably up to 300 L/$m^2$·h, or even more preferably up to 200 L/$m^2$·h, under a pressure of 0.1 to 4 bar, preferably 1 to 3 bar, or even more preferably about 2 bar, at a thickness of up to 300 μm, preferably up to 200 μm, or even more preferably up to 100 μm. In some embodiments, the ceramic membrane prepared by the method of the present disclosure has a water contact angle less than or equal to 5 degrees (°), preferably less than or equal to 4°, or even more preferably less than or equal to 3°. In some further embodiments, the ceramic membrane prepared by the method of the present disclosure has an oil contact angle greater than or equal to 150°, preferably greater than or equal to 170°, or even more preferably greater than or equal to 190°. Other ranges are also possible.

The $SiO_2$@SiC/PA@$Al_2O_3$ ceramic membrane was thoroughly characterized by several membrane characterization techniques and was further evaluated for its potential in separating surfactant stabilized oil-in-water (O/W) emulsion feed. Experimental results indicate that the ceramic membrane prepared by the membrane of the present disclosure demonstrates that the ceramic membrane maintained a separation efficiency of >98% with permeate flux of 270 L/$m^2$·h at a transmembrane pressure of 2 bar. Furthermore, the long-term filtration tests revealed that $SiO_2$@SiC/PA@$Al_2O_3$ ceramic membrane retained its separation efficiency at >98% for 420 minutes when 125 ppm O/W emulsion was used as feed.

The crystalline structures of SiC, $SiO_2$@SiC, $NH_2$—$SiO_2$@SiC, and the $NH_2$—$SiO_2$@SiC covered $Al_2O_3$ membrane ($NH_2$—$SiO_2$@SiC/PA@$Al_2O_3$) may be characterized by X-ray diffraction (XRD), respectively. In some embodiments, the XRD patterns are collected in a Powder X-ray diffractometer (Rigaku benchtop X-ray diffractometer, Miniflex 600) equipped with a Cu-Kα radiation source (λ=0.15406 nm) for a 2θ range extending between 5 and 80°, preferably 15 and 70°, further preferably 30 and 60° at an angular rate of 0.005 to 0.04° $s^{-1}$, preferably 0.01 to 0.03° $s^{-1}$, or even preferably 0.02° $s^{-1}$.

Figure 5A:
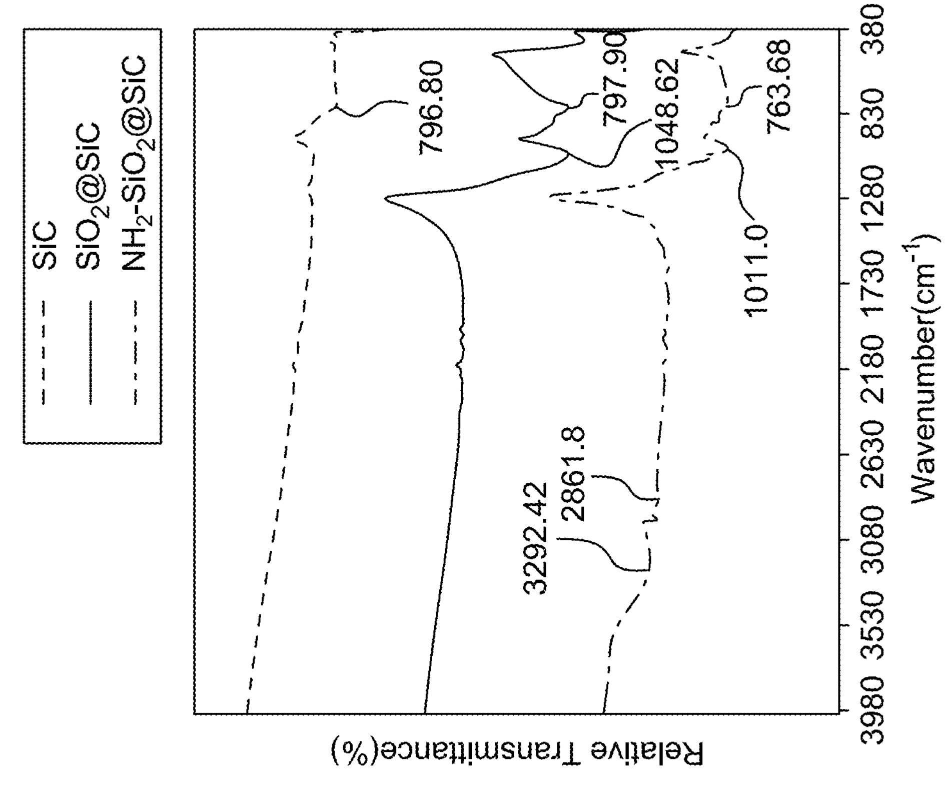
FIG. 5A depicts Fourier Transform Infrared (FTIR) spectrum of SiC (a), $SiO_2$@SiC (b), and $NH_2$—$SiO_2$@SiC (c), according to certain embodiments.
Figure 5B:
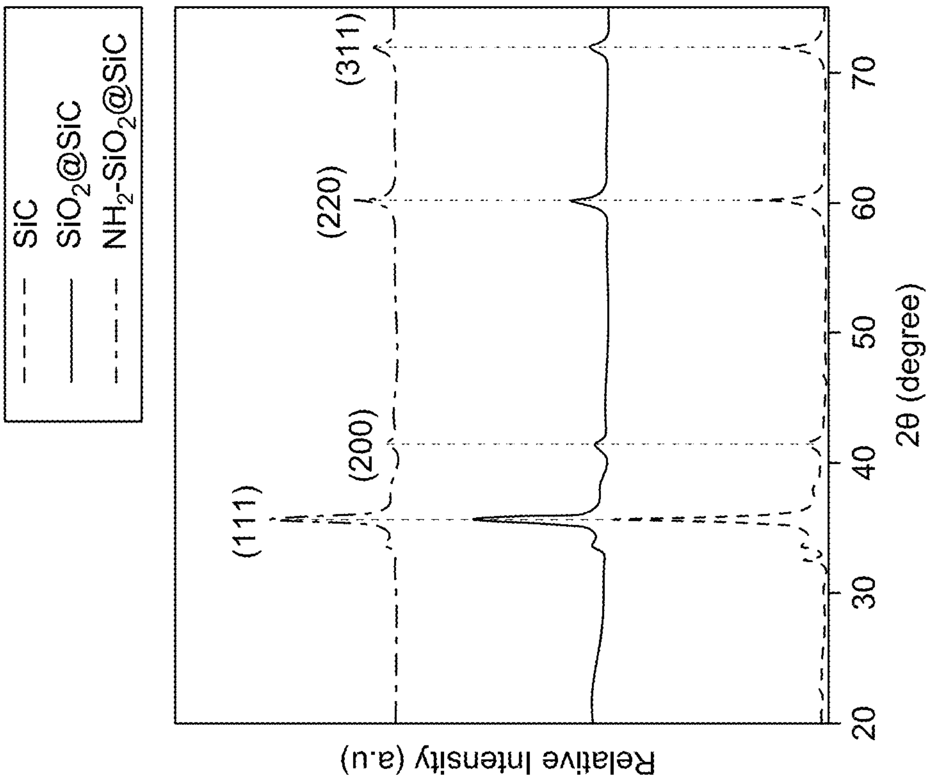
FIG. 5B depicts powdered X-ray diffractogram (PXRD) patterns of SiC (a), $SiO_2$@SiC (b), and $NH_2$—$SiO_2$@SiC (c), according to certain embodiments.

In some embodiments, the SiC has a first intense peak with a 2 theta (θ) value in a range of 32 to 40° in an X-ray diffraction (XRD) spectrum, more preferably about 36°; a second intense peak with a 2θ value in a range of 38 to 46° in the XRD spectrum, more preferably about 42°; a third intense peak with a 2θ value in a range of 56 to 64° in the XRD spectrum, more preferably about 60°; a fourth intense peak with a 2θ value in a range of 70 to 78° in the XRD spectrum, more preferably about 74°, as depicted in FIG. 5B.

In some embodiments, the $SiO_2$@SiC has a first intense peak with a 2 theta (θ) value in a range of 20 to 30° in an X-ray diffraction (XRD) spectrum; a second intense peak with a 2θ value in a range of 32 to 40° in the XRD spectrum, more preferably about 36°; a third intense peak with a 2θ value in a range of 38 to 46° in the XRD spectrum, more preferably about 42°; a fourth intense peak with a 2θ value in a range of 56 to 64° in the XRD spectrum, more preferably about 60°; a fifth intense peak with a 2θ value in a range of 70 to 78° in the XRD spectrum, more preferably about 74°, as depicted in FIG. 5B.

In some embodiments, the $NH_2$—$SiO_2$@SiC has a first intense peak with a 2 theta (θ) value in a range of 20 to 30° in an X-ray diffraction (XRD) spectrum; a second intense peak with a 2θ value in a range of 32 to 40° in the XRD spectrum, more preferably about 36°; a third intense peak with a 2θ value in a range of 38 to 46° in the XRD spectrum, more preferably about 42°; a fourth intense peak with a 2θ value in a range of 56 to 64° in the XRD spectrum, more preferably about 60°; a fifth intense peak with a 2θ value in a range of 70 to 78° in the XRD spectrum, more preferably about 74°, as depicted in FIG. 5B.

Figure 5D:
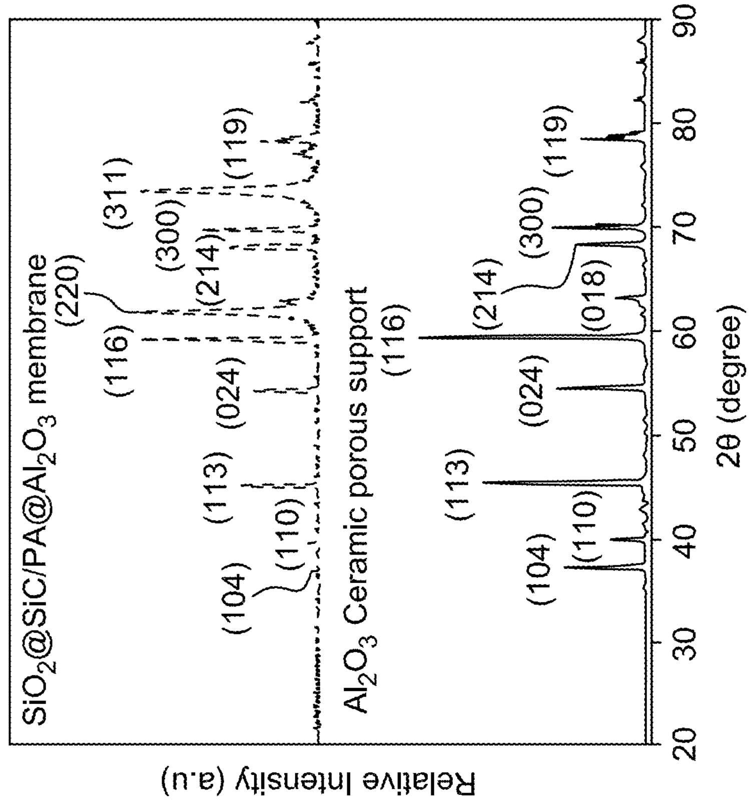
FIG. 5D depicts PXRD patterns of $Al_2O_3$ ceramic porous support and $SiO_2$@SiC/PA@$Al_2O_3$ ceramic membrane, according to certain embodiments.

In some embodiments, the $NH_2$—$SiO_2$@SiC/PA@$Al_2O_3$ has a first intense peak with a 2 theta (θ) value in a range of 20 to 30° in an X-ray diffraction (XRD) spectrum; a second intense peak with a 2θ value in a range of 30 to 40° in the XRD spectrum, more preferably about 36°; a third intense peak with a 2θ value in a range of 40 to 50° in the XRD spectrum, more preferably about 42°; a fourth intense peak with a 2θ value in a range of 50 to 70° in the XRD spectrum, more preferably about 60°; a fifth intense peak with a 2θ value in a range of 70 to 80° in the XRD spectrum, more preferably about 74°, as depicted in FIG. 5D.

The surface morphologies of $Al_2O_3$, and the $NH_2$—$SiO_2$@SiC covered $Al_2O_3$ membrane ($NH_2$—$SiO_2$@SiC/PA@$Al_2O_3$) may be characterized by scanning electron microscope (SEM), respectively. In some embodiments, the SEM images are collected in a JEOL (JSM-6610) scanning electron microscope.

Figure 7A:
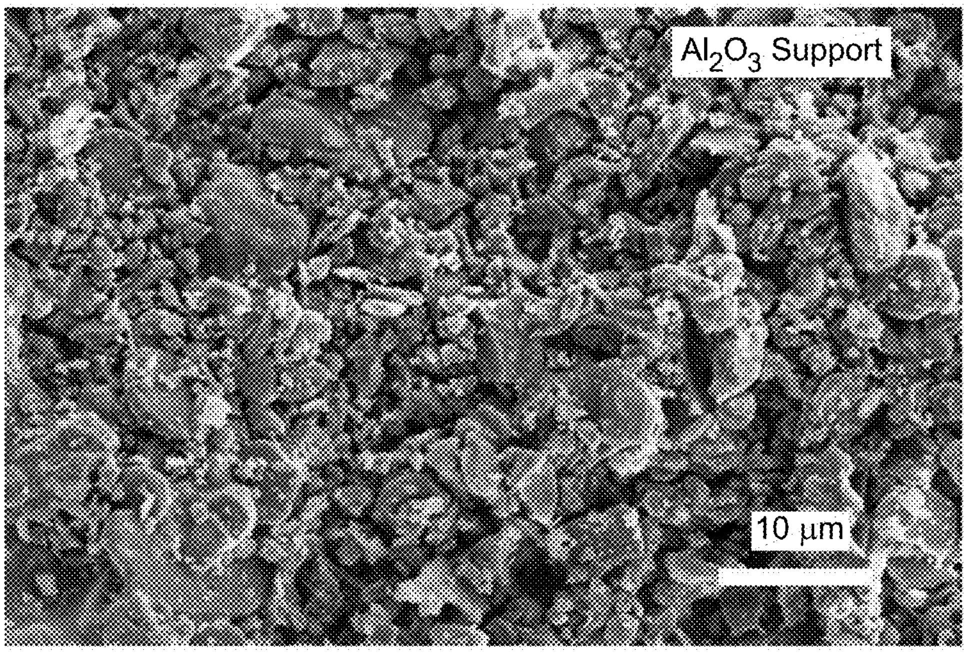
FIG. 7A and FIG. 7B shows scanning electron microscope (SEM) images of $Al_2O_3$ ceramic porous support, at different magnifications, according to certain embodiments.
Figure 7B:
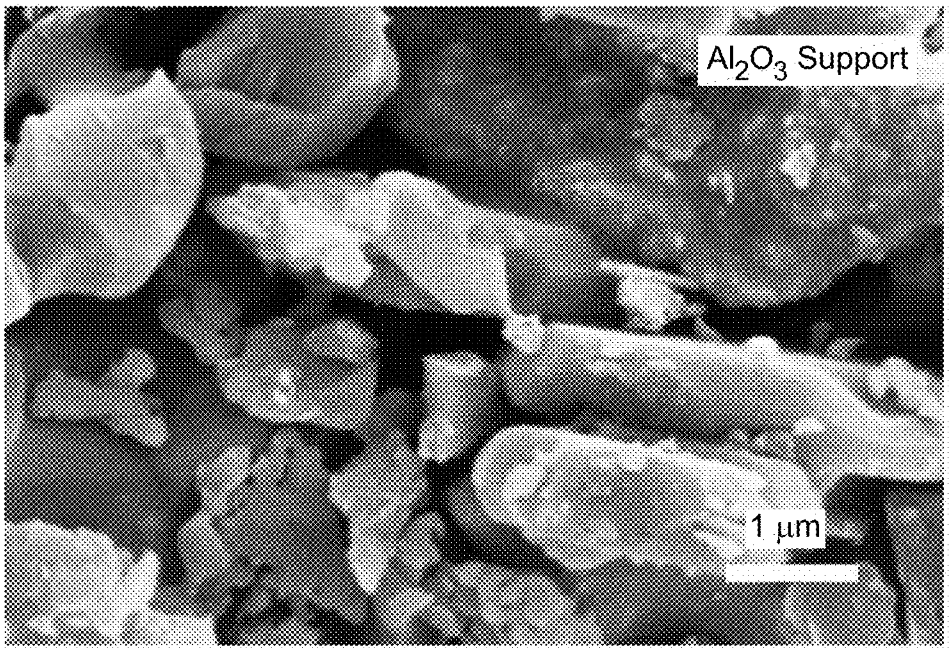
Figure 7C:
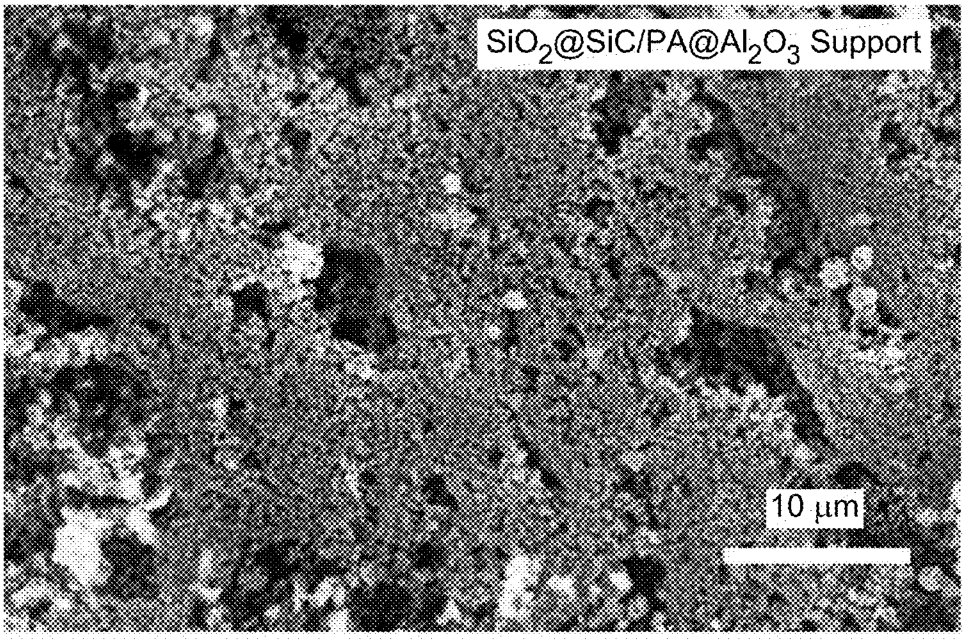
FIG. 7C and FIG. 7D show SEM images of the $SiO_2$@SiC/PA@$Al_2O_3$ ceramic membrane at different magnifications, according to certain embodiments.
Figure 7D:
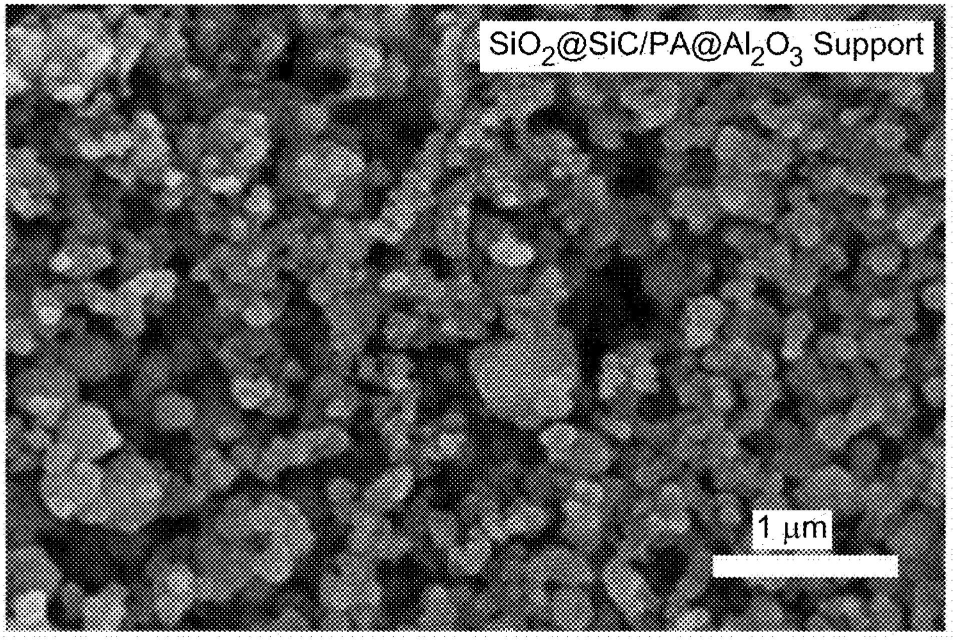
Figure 8A:
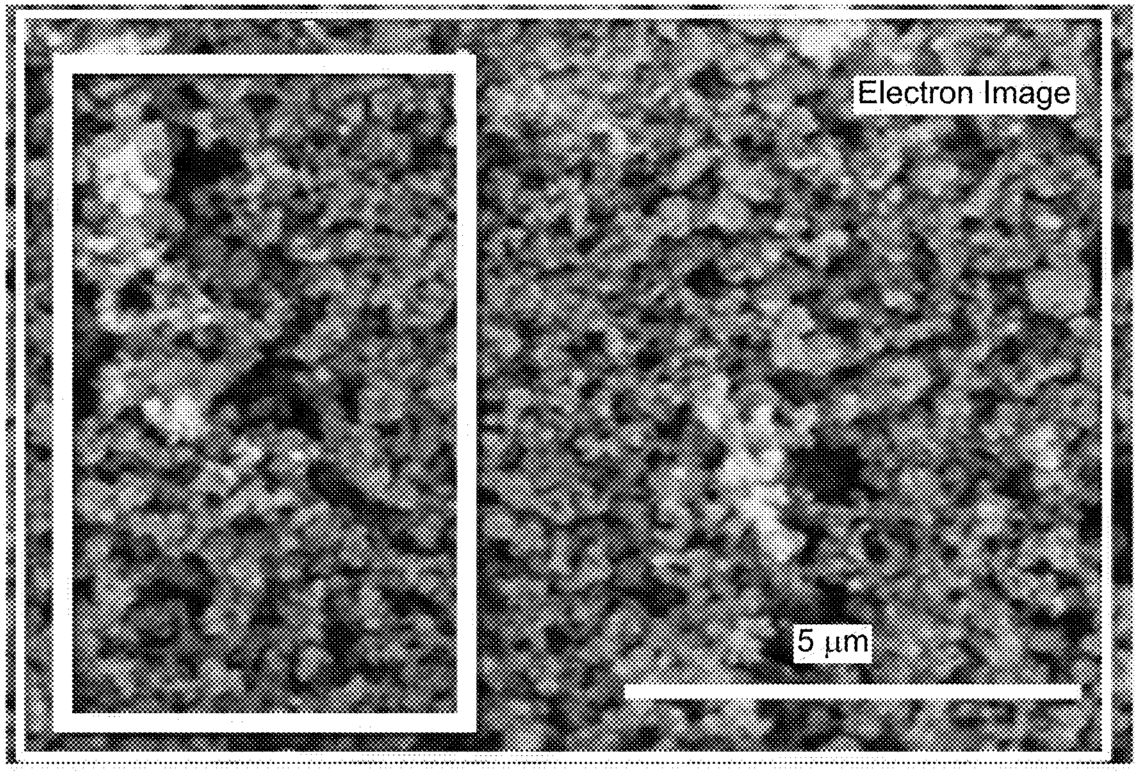
FIG. 8A shows an electron image of the $SiO_2$@SiC/PA@$Al_2O_3$ ceramic membrane, according to certain embodiments.
Figure 8B:
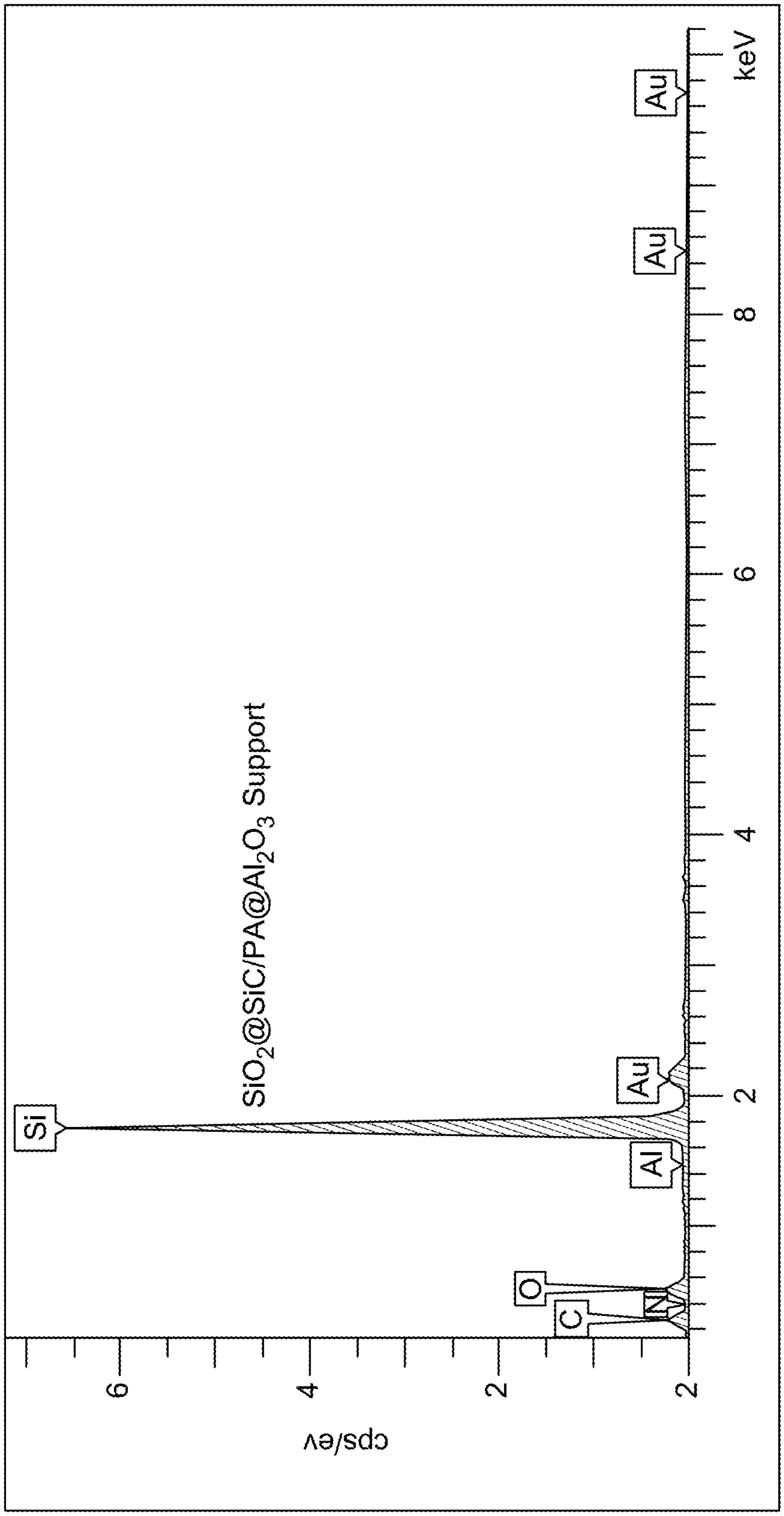
FIG. 8B shows an energy dispersive X-ray spectroscopy (EDS) spectrum of the $SiO_2$@SiC/PA@$Al_2O_3$ ceramic membrane, according to certain embodiments.
Figure 8C:
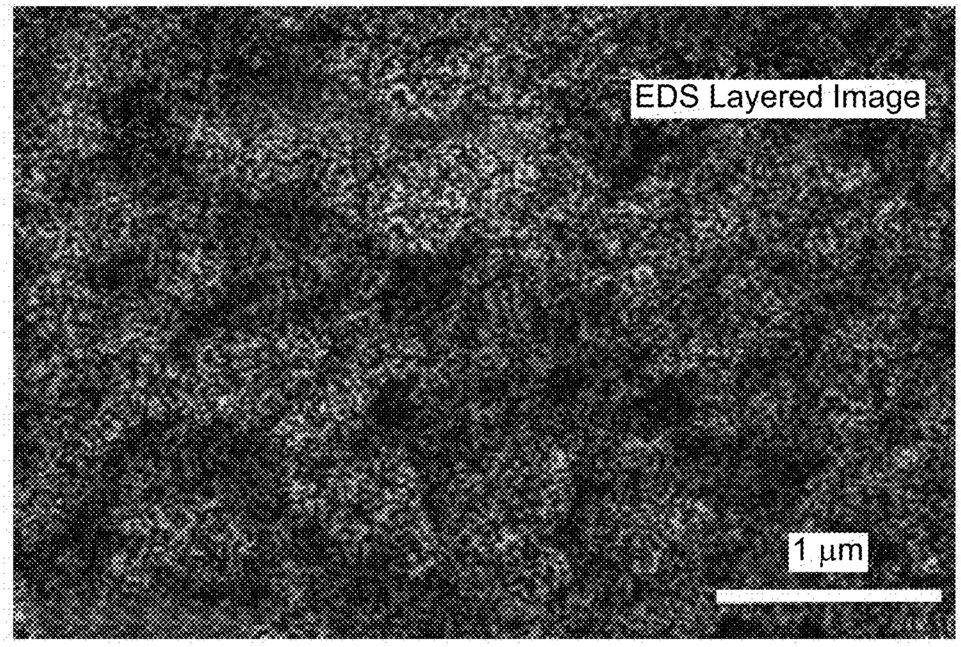
FIG. 8C shows an EDS layered image of the $SiO_2$@SiC/PA@$Al_2O_3$ ceramic membrane, according to certain embodiments.
Figure 8D:
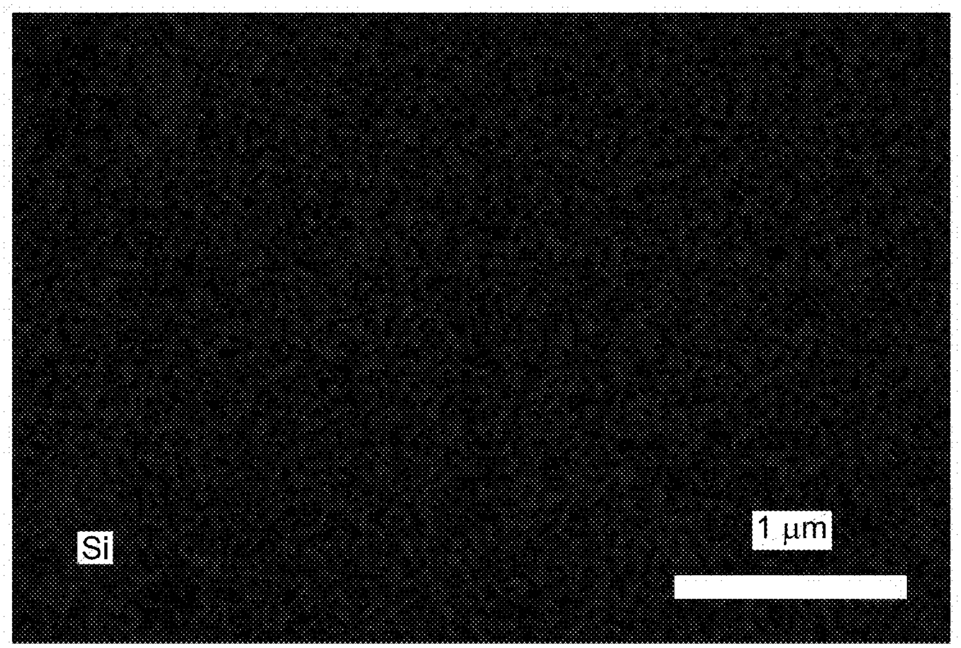
FIG. 8D-FIG. 8H shows elemental mapping analysis of elements silicon (Si), carbon I, nitrogen (N), oxygen (O), and aluminum (Al), respectively, in the $SiO_2$@SiC/PA@$Al_2O_3$ ceramic membrane, according to certain embodiments.
Figure 8E:
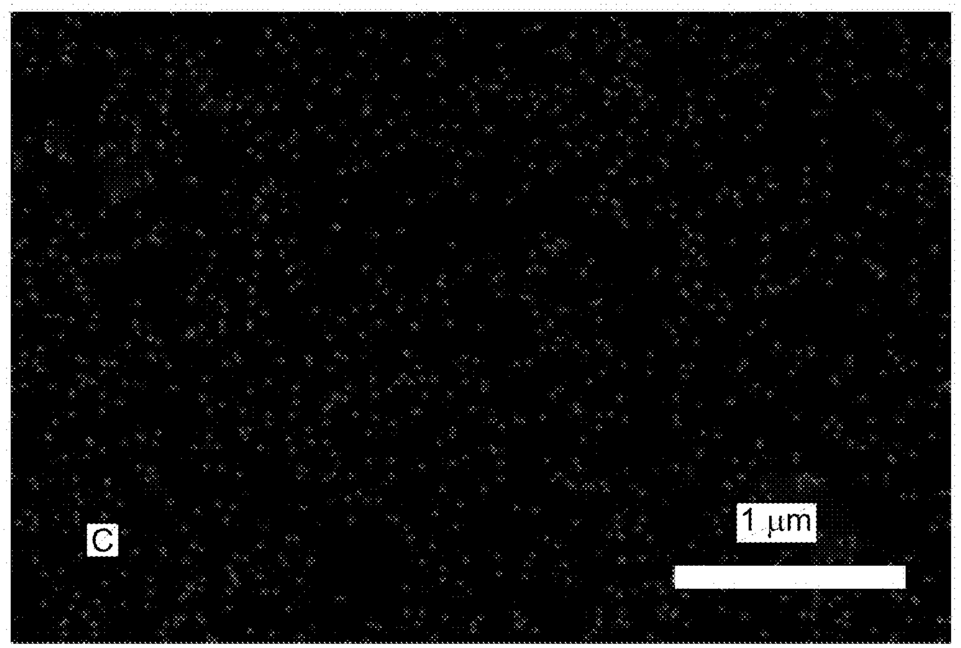
Figure 8F:
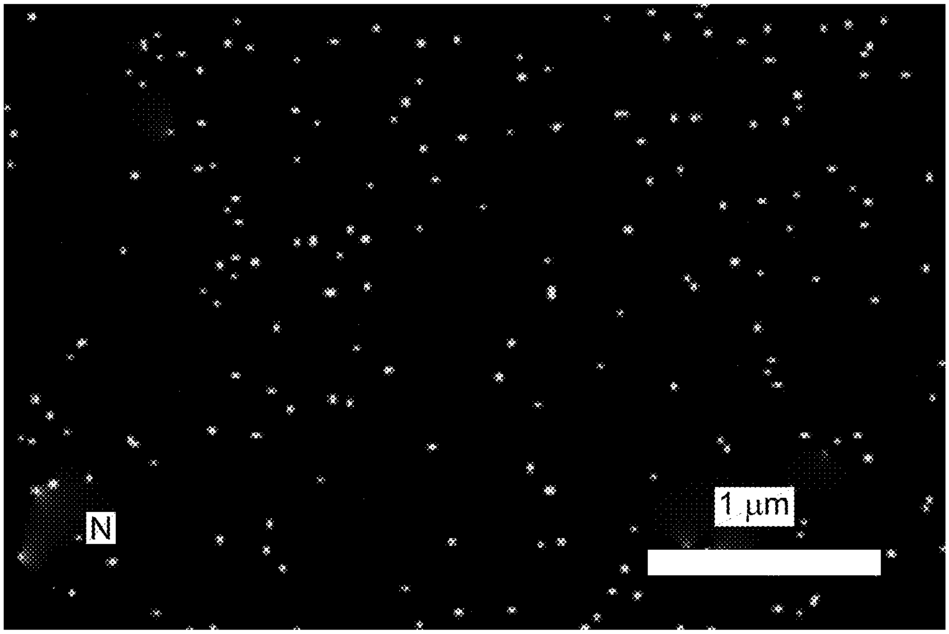
Figure 8G:
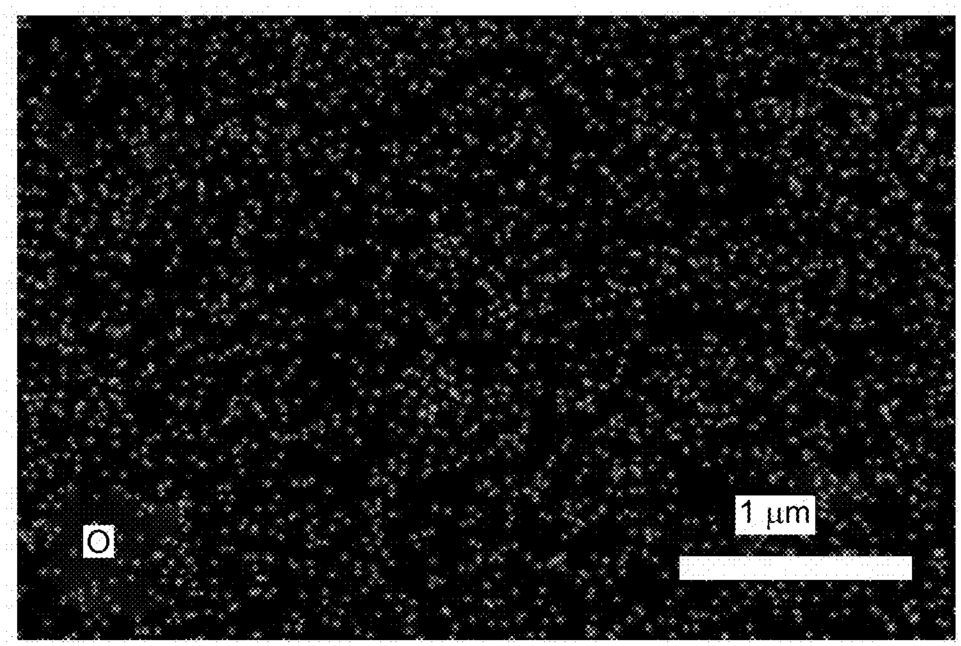
Figure 8H:
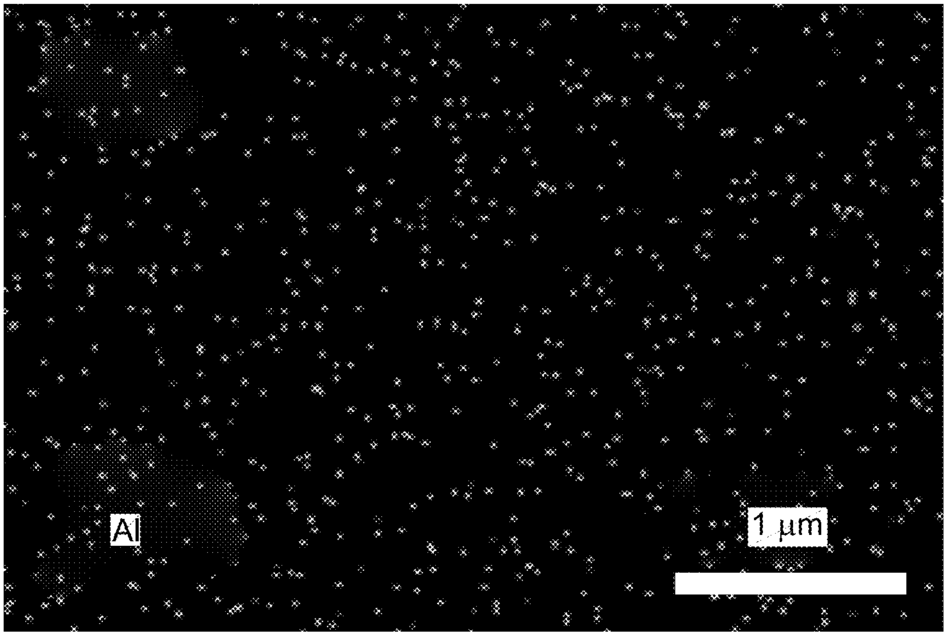

In some embodiments, the $Al_2O_3$ support has irregular shaped sized particles having an average size of 1 to 10 μm, preferably 2 to 8 μm, preferably 3 to 6 μm, or even more preferably about 5 μm, as depicted in FIGS. 7A and 7B. In some further embodiments, the $NH_2$—$SiO_2$@SiC/PA@$Al_2O_3$ particles have a porous structure morphology with a rough surface having gaps between particles, as depicted in FIGS. 7C and 7D. In some preferred embodiments, the $NH_2$—$SiO_2$@SiC/PA@$Al_2O_3$ nanoparticles have an average particle size of 0.1 to 1 μm, preferably 200 to 800 nanometers (nm), or even more preferably 400 to 600 nm. Other ranges are also possible.

According to another aspect of the present disclosure, a method of separating oil from an oil-containing liquid mixture is described. The oil and water mixture may include one or more oils selected from toluene, hexane, cyclohexane, dichloromethane, plant oil, isooctane, lubricating oil, motor oil, crude oil, diesel oil, and gasoline. During the separation process, the oil-containing liquid mixture is contacted with the ceramic membrane to form a purified aqueous composition by rejecting the oil and allowing the oil-containing liquid mixture to pass through the membrane. The oil is present in the oil-containing liquid mixture at a concentration of up to 300 ppm, preferably up to 250 ppm, or even more preferably up to 200 ppm, having a separation efficiency of at least 90% based on an initial oil concentration in the oil-containing liquid mixture, preferably at least 95%, or even more preferably at least 99% based on the initial oil concentration in the oil-containing liquid mixture.

EXAMPLES

The following examples demonstrate the ceramic membrane, as described herein. The examples are provided solely for illustration and are not to be construed as limitations of the present disclosure, as many variations thereof are possible without departing from the spirit and scope of the present disclosure.

Example 1: Chemicals and Reagents

β-phase silicon carbide nanopowder (99.99%), 3-triethoxysilylpropylamine (99%) (APTES), piperazine (99%), terephthaloyl chloride (99%), ethanol (99.8%), n-hexane (99%), triethylamine (99.5%) and sodium dodecyl sulfate (99%) were obtained from Sigma Aldrich (USA). Porous alumina support was purchased from China and Diesel oil was purchased locally.

Example 2: Synthesis of Amino-Functionalized $NH_2$—$SiO_2$@SiC

Referring to FIG. 2, a schematic representation depicting a possible route for the amino-functionalization of silicon carbide (SiC) leading to amino-functionalized silicon carbide ($NH_2$—$SiO_2$@SiC) is described. The amine functionalization of SiC was carried out as follows. 2 g of SiC powder was taken in an alumina crucible and kept in a furnace set at 700° C. for 2 h in an abundant supply of air (202). After the completion of the calcination reaction, the $SiO_2$@SiC was removed from the furnace and used for further reaction with APTES. 1 g of $SiO_2$@SiC was dispersed in 100 mL of ethanol (95%) in a round bottom flask equipped with a magnetic stirrer, and 5 mL of APTES were added into the above stirring solution. The reaction was continued for 24 h at room temperature leading to the formation of a greyish-black slurry, which was subjected to filtration. An excess of ethanol and distilled water were used for removing the residual unreacted reactants and cleaning the product. The obtained product was completely dried in an oven at 50° C. for 1 h and finely ground by using a mortar and pestle before analysis and further use. The amine-functionalized product was named $NH_2$—$SiO_2$@SiC (204).

Example 3: Fabrication of $SiO_2$@SiC/PA@$Al_2O_3$Ceramic Membrane

Referring to FIG. 3, a schematic representation of the various steps adopted during the fabrication of $SiO_2$@SiC/PA@$Al_2O_3$ ceramic membrane is depicted. The $SiO_2$@SiC/PA@$Al_2O_3$ ceramic membrane was fabricated by adopting our previously developed new procedure for ceramic membrane fabrication [Baig, U., Waheed, A., Abussaud, B., Aljundi, I. H., 2022b. A Simple Approach to Fabricate Composite Ceramic Membranes Decorated with Functionalized Carbide-Derived Carbon for Oily Wastewater Treatment. Membranes 12, 394, which is incorporated herein by reference in its entirety]. In this typical procedure, commercially available alumina ($Al_2O_3$) ceramic support was dipped for 2 h in (0.5% wt/v) SDS aqueous solution to increase the wettability of ceramic support. Next, the SDS-treated $Al_2O_3$ ceramic support was fixed in a dead-end filtration cell (Sterlitech) and the cell was loaded with a solution containing 0.1 g $NH_2$—$SiO_2$@SiC in (2% wt./v) aqueous solution of PIP (100 mL) (302). The $NH_2$—$SiO_2$@SiC nanopowder was dispersed in an aqueous solution of PIP using a probe ultrasonicator for 15 min at room temperature and then this homogeneous dispersion of amino-functionalized $NH_2$—$SiO_2$@SiC nanopowder was passed 3 times through the porous $Al_2O_3$ support at constant pressure (~0.5 bar) of $N_2$ gas. The $N_2$ pressure forced the solution to pass through the ceramic support in a way that the suspended $NH_2$—$SiO_2$@SiC was deposited on $Al_2O_3$ ceramic support along with simultaneous PIP impregnation of the $Al_2O_3$ support. After loading of $NH_2$—$SiO_2$@SiC and impregnation of $Al_2O_3$ support, the membrane was allowed to dry in an oven at 60° C. for 15 minutes. The dried $NH_2$—$SiO_2$@SiC containing PIP impregnated $Al_2O_3$ membrane was subjected to interfacial polymerization (IP). During an event of IP reaction, $NH_2$—$SiO_2$@SiC containing PIP-impregnated $Al_2O_3$ membrane was dipped in a 0.15% (wt/v) n-hexane solution of TPC (100 mL). The IP reaction was continued for 10 minutes, and the membrane was removed from the n-hexane solution and washed with clean n-hexane to remove excess unreacted monomers (304). Finally, the membrane was cured in an oven at 60° C. for 1 h leading to the desired membrane named as $SiO_2$@SiC/PA@$Al_2O_3$ ceramic membrane (306).

Example 4: Characterization

The pure silicon carbide (SiC), silicon dioxide loaded SiC ($SiO_2$@SiC), amino-functionalized $NH_2$—$SiO_2$@SiC, and $SiO_2$@SiC/PA@$Al_2O_3$ ceramic membrane were characterized by Attenuated Total Reflectance Fourier-Transform Infrared Spectroscopy (ATR-FTIR: Thermo Nicolet iS50) (manufactured by Thermo Fisher Scientific, 168 Third Avenue. Waltham, MA USA 02451) and powdered X-ray diffractometer (PXRD: manufactured by Rigaku Miniflex-II, 2601A, Tengda Plaza, No. 168, Xizhimenwai Ave). The remaining membrane features were evaluated using a scanning electron microscope (SEM: JEOL Rigaku Miniflex-II, manufactured by Rigaku Miniflex-II, 2601A, Tengda Plaza, No. 168, Xizhimenwai Ave). The surface wetting and non-wetting behavior of the ceramic $SiO_2$@SiC/PA@$Al_2O_3$ membrane for oil and water were also determined using a KRUSS DSA25 Drop shape analyzer (WCA: KRUSS DSA25, manufactured by Kruss, Alsterdorfer Str. 276-278, 22297 Hamburg, Germany).

Example 5: Oil/Water Emulsion Separation Test

The oil/water emulsion separation performance of the fabricated ceramic $SiO_2$@SiC/PA@$Al_2O_3$ membrane was measured by studying various parameters, such as the effect of pressure (0.5 to 2 bar), oil/water emulsion concentration (33.75 to 250 ppm), and long-term stability (up to 420 min) using a dead-end filtration cell. The pre-wetted membrane was carefully fitted in the filtration cell and then compacted with distilled water for 30 minutes. After compaction, the effect of pressure, oil/water emulsion concentration, and long-term stability test were performed. In addition, the permeate of every experiment was collected. Feeds and the collected permeate were tested by spectrofluorimetry (JASCO FP-835 (manufactured by Jasco Corporation, 2967-5, Ishikawa-machi, Hachioji, Tokyo 192-8537, Japan), optical microscopy (Nikon E200; manufactured by Nikon, Shinagawa Intercity Tower C, 2-15-3, Konan, Minato-ku, Tokyo 108-6290), and by portable turbidity meter (HANNA, H198703; manufactured by Hanna Instruments, 270 George Washington Hwy, Smithfield, Rhode Island, 02917, United States).

Example 6: Characterizations

The synthesis of amine-functionalized $NH_2$—$SiO_2$@SiC aims to facilitate uniform covalent crosslinking of SiC as an active layer of the ceramic membrane. To enhance the possibility of coating SiC with ATPES, $SiO_2$ was generated at the surface of SiC, which provided the sites for the well-known condensation reaction APTES with $SiO_2$. The APTES coating through covalent bonds led to amine (—$NH_2$) functionalization of $SiO_2$@SiC, resulting in $NH_2$—$SiO_2$@SiC (FIG. 2). The presence of several covalently bonded amino groups (—$NH_2$) on the surface of $NH_2$—$SiO_2$@SiC made them ideal for crosslinking with acyl chloride (—COCl) functional groups of terephthaloyl chloride (TPC). The covalent bonding of $NH_2$—$SiO_2$@SiC with TPC resulted in uniform distribution and stable incorporation of $NH_2$—$SiO_2$@SiC in the active layer of the $SiO_2$@SiC/PA@$Al_2O_3$ ceramic membrane (FIG. 3).

$SiO_2$@SiC/PA@$Al_2O_3$ ceramic membrane was fabricated by using an interfacial polymerization (IP) reaction. The IP reaction between-$NH_2$ groups of $NH_2$—$SiO_2$@SiC and —COCl group of TPC resulted in a composite active layer composed of uniformly distributed and covalently cross-linked SiC and polyamide network in the ceramic membrane. Moreover, adding PIP as an extra secondary diamine led to even more crosslinking and the formation of SiC crosslinked composite polyamide network of various reacting monomers (TPC and $NH_2$—$SiO_2$@SiC) in the active layer of the ceramic membrane (FIG. 4).

Referring to FIG. 5A, an FT-IR spectrum of SiC (a), $SiO_2$@SiC (b), and $NH_2$—$SiO_2$@SiC (c) is depicted. The presence of essential constituent functional groups in $NH_2$—$SiO_2$@SiC (c) and $SiO_2$@SiC/PA@$Al_2O_3$ ceramic membrane was confirmed by ATR-FTIR. The ATR-FTIR spectrum of SiC (FIG. 3 (*a*)) was devoid of any peaks until a broad peak appeared spanning from 790 $cm^{-1}$ 900 $cm^{-1}$, which was a confirmatory peak of Si—C stretching frequency [Li, Y., Chen, C., Li, J. T., Yang, Y., Lin, Z. M., 2011. Surface charges and optical characteristic of colloidal cubic SiC nanocrystals. Nanoscale Res. Lett. 6, 1-7, which is incorporated herein by reference in its entirety]. In the case of $SiO_2$@SiC (b), in addition to Si—C peak, another very strong peak was observed at around 1000 $cm^{-1}$-1050 $cm^{-1}$, which was attributed to the presence of Si—O—Si stretching vibration [Sun, Z. G., Wang, S. J., Qiao, X. J., Li, Y., Zheng, W. H., Bai, P. Y., 2018. Synthesis and microwave absorbing properties of SiC nanowires. Appl. Phys. A 124, 1-8, which is incorporated herein by reference in its entirety]. Similarly, the ATR-FTIR spectrum of $NH_2$—$SiO_2$@SiC (c) showed all of the aforementioned peaks of Si—C and Si—O—Si. However, upon amine functionalization, a characteristic amine diagnostic broad peak was detected in the region of 3500 $cm^{-1}$ to 3200 $cm^{-1}$, which was attributed to amine groups of APTES. Moreover, a small sharp peak was also observed at around 2861.8 $cm^{-1}$, which was due to stretching vibration aliphatic —$CH_2$ groups of propyl chains of APTES) [Baig, U., Waheed, A., Abussaud, B., Aljundi, I. H., 2022b. A Simple Approach to Fabricate Composite Ceramic Membranes Decorated with Functionalized Carbide-Derived Carbon for Oily Wastewater Treatment. Membranes 12, 394, which is incorporated herein by reference in its entirety].

Referring to FIG. 5B, the PXRD patterns of SiC (a), $SiO_2$@SiC (b), and $NH_2$—$SiO_2$@SiC (c), are depicted. The PXRD of the SiC showed the presence of characteristics peaks which were due to (111), (200), (220), and (311) reflections which were located at 36°, 42°, 60°, and 74°, respectively [Wang, F. L., Zhang, L. Y., Zhang, Y. F., 2009. SiC nanowires synthesized by rapidly heating a mixture of SiO and arc-discharge plasma pretreated carbon black. Nanoscale Res. Lett. 4, 153-156, which is incorporated herein by reference in its entirety]. The $SiO_2$@SiC (b) PXRD pattern showed an additional amorphous peak at $2\theta=20°-30°$, which was attributed to the formation of the amorphous phase of $SiO_2$ onto SiC [Wang, D., Wang, H., Cao, H., Tu, S., Xue, J., 2020. Synthesis and in situ growth mechanism of $SiO_2$@SiC core-shell nanocomposite. Appl. Phys. A 126, 1-5, which is incorporated herein by reference in its entirety].

Figure 5C:
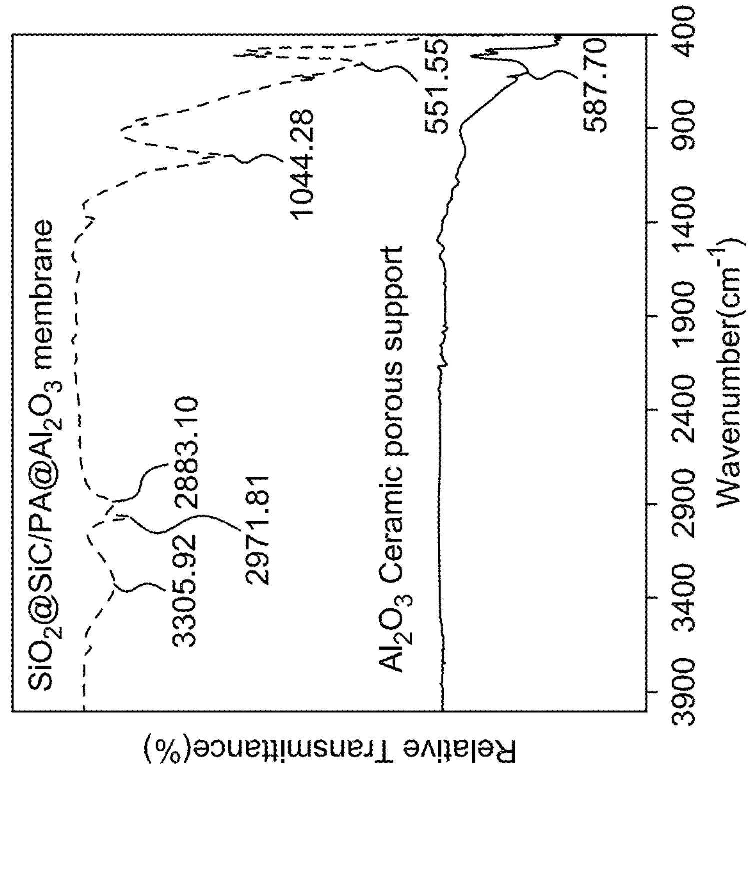
FIG. 5C depicts FTIR spectrum of $Al_2O_3$ ceramic porous support and $SiO_2$@SiC/PA@$Al_2O_3$ ceramic membrane, according to certain embodiments.

Referring to FIG. 5C, an ATR-FTIR spectrum of $Al_2O_3$ ceramic porous support and $SiO_2$@SiC/PA@$Al_2O_3$ ceramic membrane is depicted. The ATR-FTIR of $Al_2O_3$ support and $SiO_2$@SiC/PA@$Al_2O_3$ ceramic membrane shows various functionalities that have been identified to establish the structure of the membranes. A strong vibration band located at 587.70 $cm^{-1}$ was due to the Al—O bond of $Al_2O_3$ support. In case of $SiO_2$@SiC/PA@$Al_2O_3$ ceramic membrane, the characteristic and salient N—H vibration peak of the amide bond (—CONH) was found in the region of 3600 $cm^{-1}$ to 3400 $cm^{-1}$. The amide bond is formed due to the reaction of amine (—NH) groups of PIP and $NH_2$—$SiO_2$@SiC with acid chloride (—COCl) groups of TPC. The other defining peaks were found at 2971.81 $cm^{-1}$ and 2883.10 $cm^{-1}$, which were due to the C—H bond stretching of the aromatic ring and aliphatic —$CH_2$ groups of propyl chains of APTES and PIP. The presence of all anticipated functional groups has confirmed the success of IP and the contribution of all of the reacting agents in membrane fabrication. The C—N stretching bond vibration is located at around 1044.28 $cm^{-1}$. In addition, the Al—O band was also found at around 551.55 $cm^{-1}$.

Referring to FIG. 5D, a PXRD of $Al_2O_3$ support and $SiO_2$@SiC/PA@$Al_2O_3$ ceramic membrane is depicted. All of the peaks of $Al_2O_3$ were identified and compared with prior reference. However, the PXRD of $SiO_2$@SiC/PA@$Al_2O_3$ ceramic membrane showed certain variations, such as low angle peaks of $Al_2O_3$ support (38° and 40°) masked by $SiO_2$@SiC/PA active layer. Furthermore, the intensity of all of the peaks of $Al_2O_3$ was also reduced, which indicates the covering of the $Al_2O_3$ support due to the deposition of $SiO_2$@SiC/PA active layer. The other finding was the enhancement of the intensity of the peaks of SiC, such as the peaks at 61° and 75°[Yang, G., Huang, Z., Wang, X., Wang, B., 2018. Fabrication and Anti-Oxidation Ability of SiC—SiO2 Coated Carbon Fibers Using Sol-Gel Method. Materials 11, 350, which is incorporated herein by reference in its entirety]. Moreover, both of the peaks show broadening, which might be due to the establishment of the polymeric amorphous mass of the polyamide (PA) network in the active layer. These findings and observations indicated that functionalized $NH_2$—$SiO_2$@SiC is covalently decorated in the active layer of the $SiO_2$@SiC/PA@$Al_2O_3$ ceramic membrane.

Figure 6:
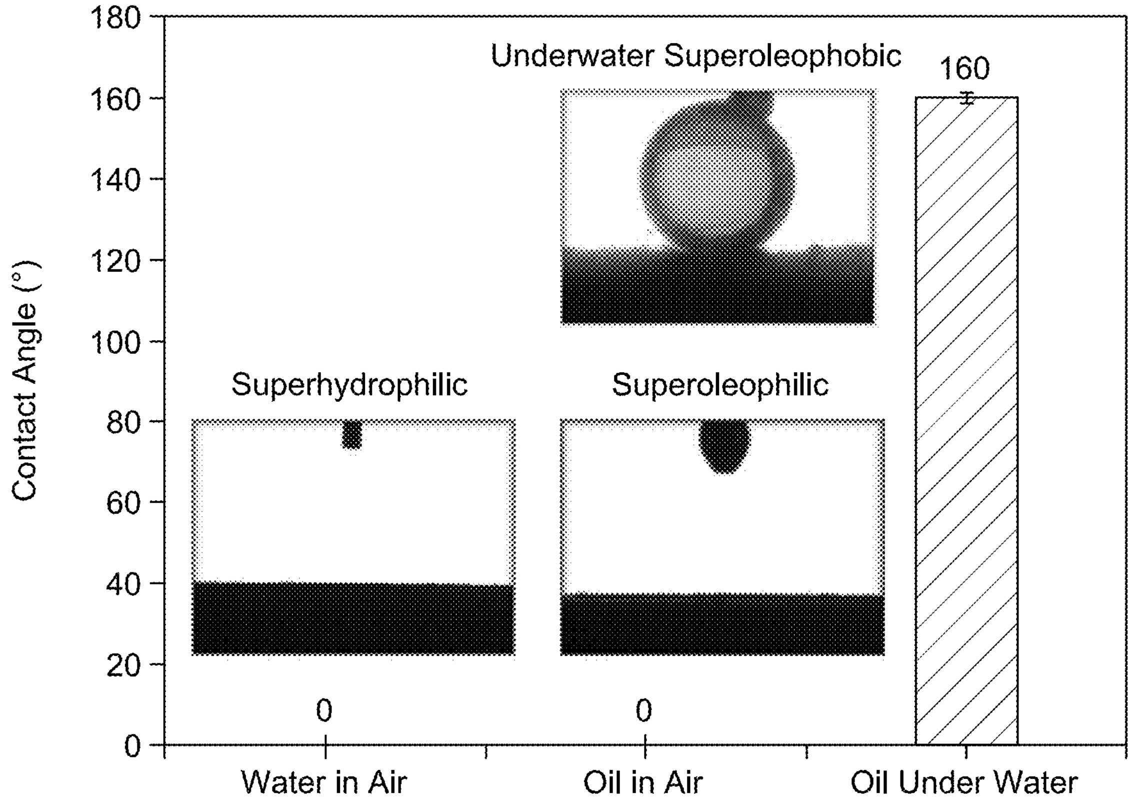
FIG. 6 is an image depicting the surface wettability behavior of the $SiO_2$@SiC/PA@$Al_2O_3$ ceramic membrane under different interfaces, such as water-in-air; oil-in-air; and oil-underwater, according to certain embodiments.

Referring to FIG. 6, an image depicting the surface wettability behavior of the $SiO_2$@SiC/PA@$Al_2O_3$ ceramic membrane under different interfaces, such as water in air, oil in air, and oil underwater, is depicted. The surface wettability of membranes is of important in understanding the performance of the membranes. For example, in the air, the membrane was found to be superhydrophilic and superoleophilic as the contact angle showed a value of 0° with both water and oil in the air. Hence, in the air, the membrane will allow water and oil to pass through it. However, an interesting feature of the $SiO_2$@SiC/PA@$Al_2O_3$ ceramic membrane was observed when the contact angle of oil underwater was measured. The underwater oil contact angle revealed a value of 160°, confirming that the $SiO_2$@SiC/PA@$Al_2O_3$ ceramic membrane is superoleophobic underwater. An underwater superoleophobic surface of the membrane is a desirable feature of a membrane as such a membrane allows only water to pass while oil is rejected under filtration conditions [Baig, U., Faizan, M., Waheed, A., 2022a. A review on super-wettable porous membranes and materials based on bio-polymeric chitosan for oil-water separation. Adv. Colloid Interface Sci. 303, which is incorporated herein by reference in its entirety]. Hence, the current approach of fabrication of $SiO_2$@SiC/PA@$Al_2O_3$ ceramic membrane allows water to pass while rejecting the oil from the O/W (oil-in-water) emulsion feed.

Referring to FIGS. 7A-7D, SEM images of $Al_2O_3$ ceramic porous support, and $SiO_2$@SiC/PA@$Al_2O_3$ ceramic membrane is depicted. Investigation of the surface morphology of the membrane is of extreme importance as it plays a crucial role in the membrane's filtration performance. The SEM analysis of $Al_2O_3$ support and $SiO_2$@SiC/PA@$Al_2O_3$ ceramic membrane shows the presence of irregularly shaped differently sized particles of $Al_2O_3$ (FIG. 7A). The high-resolution micrograph of $Al_2O_3$ (FIG. 7B) revealed a rocky texture of the ceramic support with gaps in between the particles. These features of $Al_2O_3$ ceramic support are responsible for the highly porous nature of the ceramic support, due to which $Al_2O_3$ support cannot separate surfactant stabilized O/W emulsion. However, after the deposition of the active layer, the morphology of the $SiO_2$@SiC/PA@$Al_2O_3$ ceramic membrane is altered compared to $Al_2O_3$ ceramic support. The micrograph of $SiO_2$@SiC/PA@$Al_2O_3$ ceramic membrane exhibited the presence of fine granules of $SiO_2$@SiC particles which have covered the porous structure of $Al_2O_3$ ceramic support (FIG. 7C). Moreover, a high-resolution micrograph of $SiO_2$@SiC/PA@$Al_2O_3$ ceramic membrane revealed that the $SiO_2$@SiC particles were embedded in a polyamide polymeric network formed during IP reaction between PIP, $NH_2$—$SiO_2$@SiC, and TPC (FIG. 7D). Unlike the conventional IP between PIP and TMC, the IP reaction between PIP and TPC results in linear chains of polyamide. The role of linear polyamide chains in the membrane design helped fix the $SiO_2$@SiC particles in the active layer while keeping the active layer loose which leads to high permeate pure water flux while keeping high rejection of oil.

The structural composition of the $SiO_2$@SiC/PA@$Al_2O_3$ ceramic membrane was studied by using EDX analysis, as shown in FIG. 8. It was found that $SiO_2$@SiC/PA@$Al_2O_3$ ceramic membrane was composed of constituent elements, namely silicon (Si), carbon (C), nitrogen (N), oxygen (O), and aluminum (Al), as can be observed in FIGS. 8A-8B. The presence of Si along with C is a confirmation of SiC existence in the active layer of the membrane, while O can be attributed to the $SiO_2$, $Al_2O_3$, and carbonyl (>C═O) group of TPC. The presence of Al was attributed to $Al_2O_3$ ceramic support, while N was due to PIP and $NH_2$—$SiO_2$@SiC. Hence the presence of all of the anticipated elements in the EDX analysis confirmed the successful incorporation of all of the reacting components in the fabricated membrane. Moreover, the distribution of all EDX-detected elements in $SiO_2$@SiC/PA@$Al_2O_3$ ceramic membrane was studied by elemental mapping (FIG. 8C-FIG. 8H). Elemental mapping revealed that all of the detected elements, namely Si (FIG. 8C), C (FIG. 8D), N (FIG. 8E), O (FIG. 8F), and Al (FIG. 8G) were uniformly distributed throughout the membrane's active layer. Another finding of elemental mapping was the density of the elements in the mapping image of $SiO_2$@SiC/PA@$Al_2O_3$ ceramic membrane. It can be seen that Si has the densest distribution, followed by O, while N has the least dense distribution. However, the distribution density of C and Al was in between that of Si and N. These findings showed that $SiO_2$@SiC/PA@$Al_2O_3$ ceramic membrane has a high content of SiC, which is mainly the active layer of the $SiO_2$@SiC/PA@$Al_2O_3$ ceramic membrane. The lower content of N compared to other elements confirmed that the polyamide network is loose in nature as it is not a cross-linked polyamide network because both PIP and TPC are linear bifunctional monomers.

Figure 9:
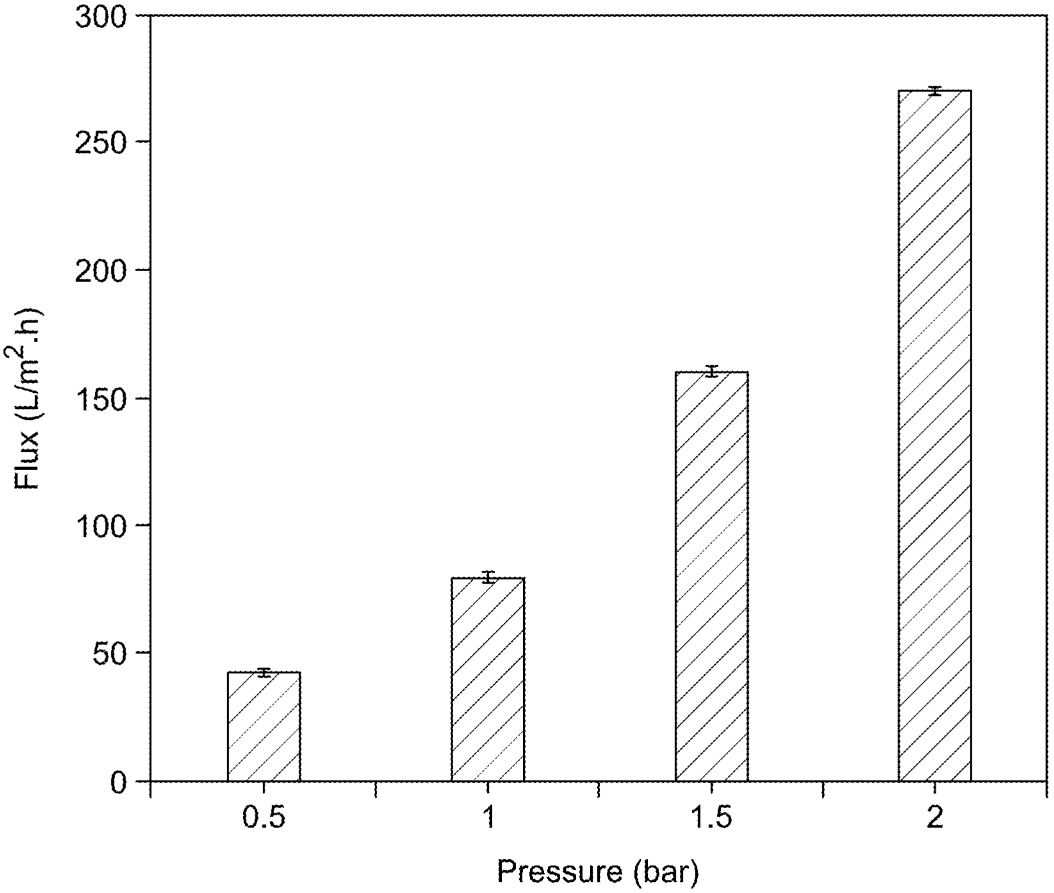
FIG. 9 is a bar graph showing the effect of transmembrane pressure on permeate flux for the $SiO_2$@SiC/PA@$Al_2O_3$ ceramic membrane, according to certain embodiments.

Referring to FIG. 9, a bar graph showing the effect of transmembrane pressure on the permeate flux using $SiO_2$@SiC/PA@$Al_2O_3$ ceramic membrane is described. After thoroughly studying and investigating the chemical structure of the $SiO_2$@SiC/PA@$Al_2O_3$ ceramic membrane, O/W emulsion separation experiments were performed in a dead-end filtration cell. The effect of increasing transmembrane pressure on the permeate flux was investigated using 67.5 ppm O/W emulsion as a feed. It was observed that with increasing transmembrane pressure, permeate flux was linearly increased, which is a well-known pattern for every well-structured membrane. As the pressure increases from 0.5 to 2.0 bar, the flux varies from 45 $L/m^{-2}$ h to 270 $L/m^{-2}$ h.

Figure 10A:
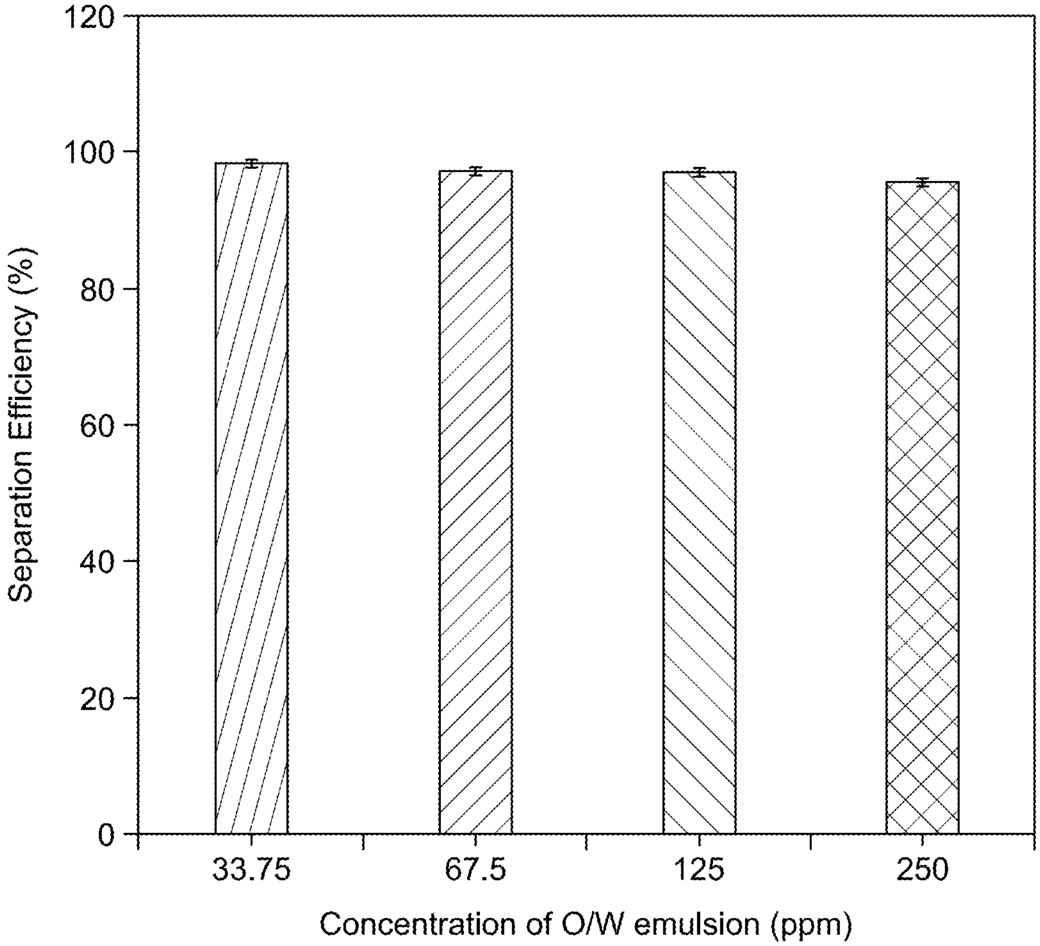
FIG. 10A is a bar graph showing the effect of various concentrations of oil-in-water (O/W) emulsions on separation efficiency (%) for the $SiO_2$@SiC/PA@$Al_2O_3$ ceramic membrane, according to certain embodiments.
Figure 10B:
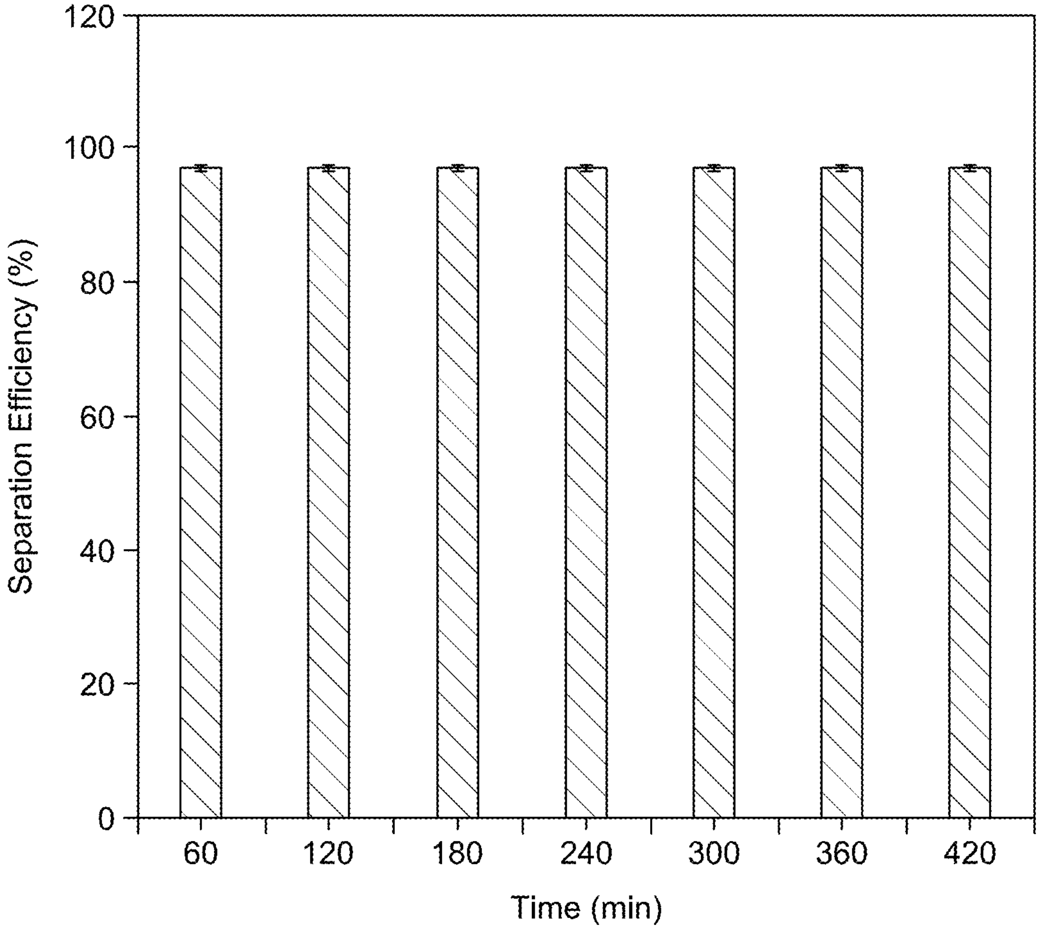
FIG. 10B is a bar graph showing the effect of time (a long-term stability test) for the $SiO_2$@SiC/PA@$Al_2O_3$ ceramic membrane, according to certain embodiments.
Figure 11A:
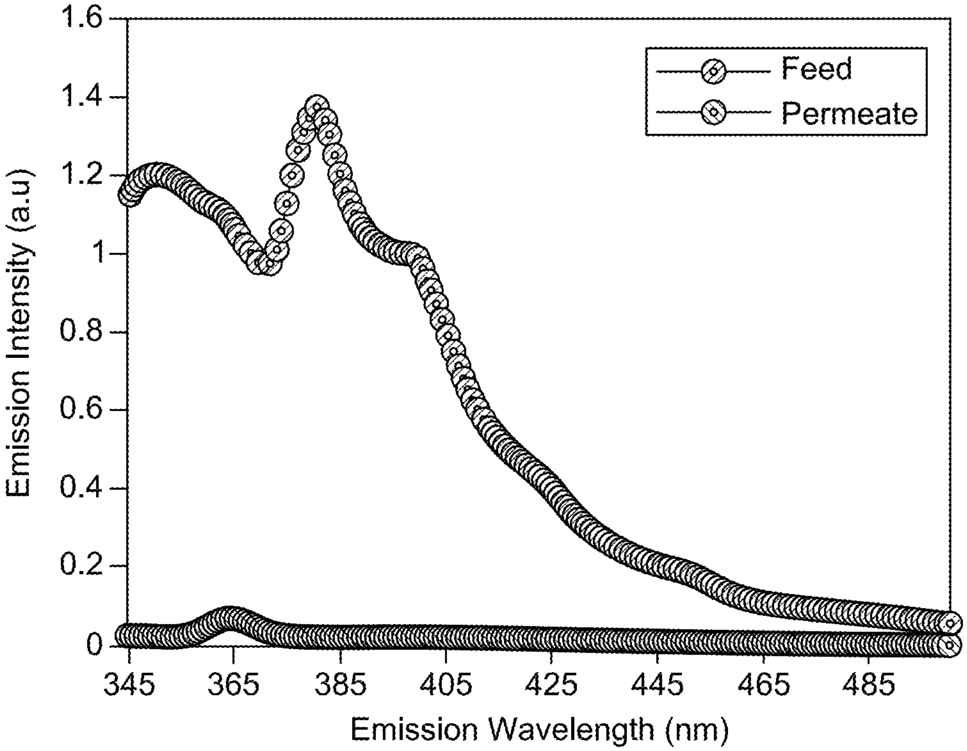
FIG. 11A is a photoluminescence (PL) spectrum of feed and permeate with 33.75 ppm O/W emulsion, according to certain embodiments.
Figure 11B:
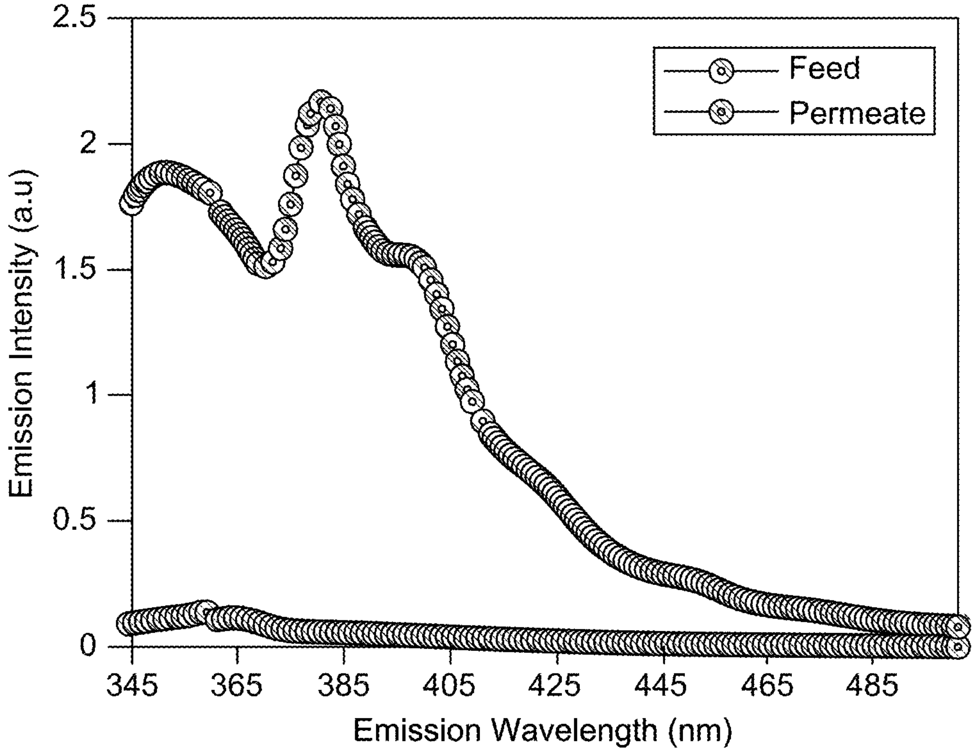
FIG. 11B is a PL spectrum of feed and permeate with 67.50 ppm O/W emulsion, according to certain embodiments.
Figure 11C:
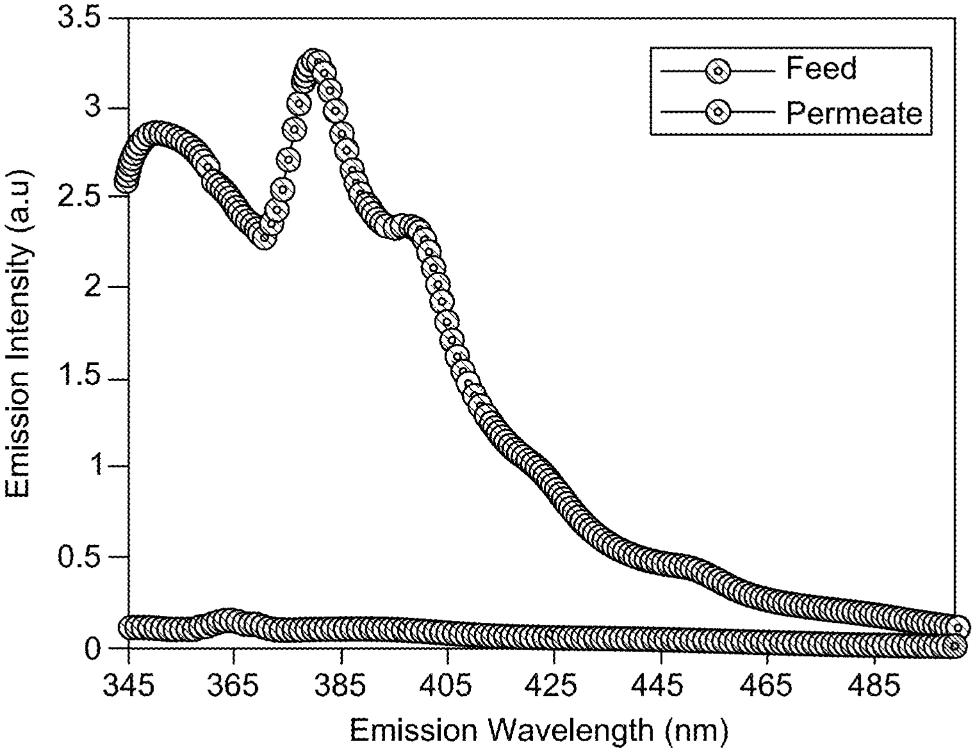
FIG. 11C is a PL spectrum of feed and permeate with 125 ppm O/W emulsion, according to certain embodiments.
Figure 11D:
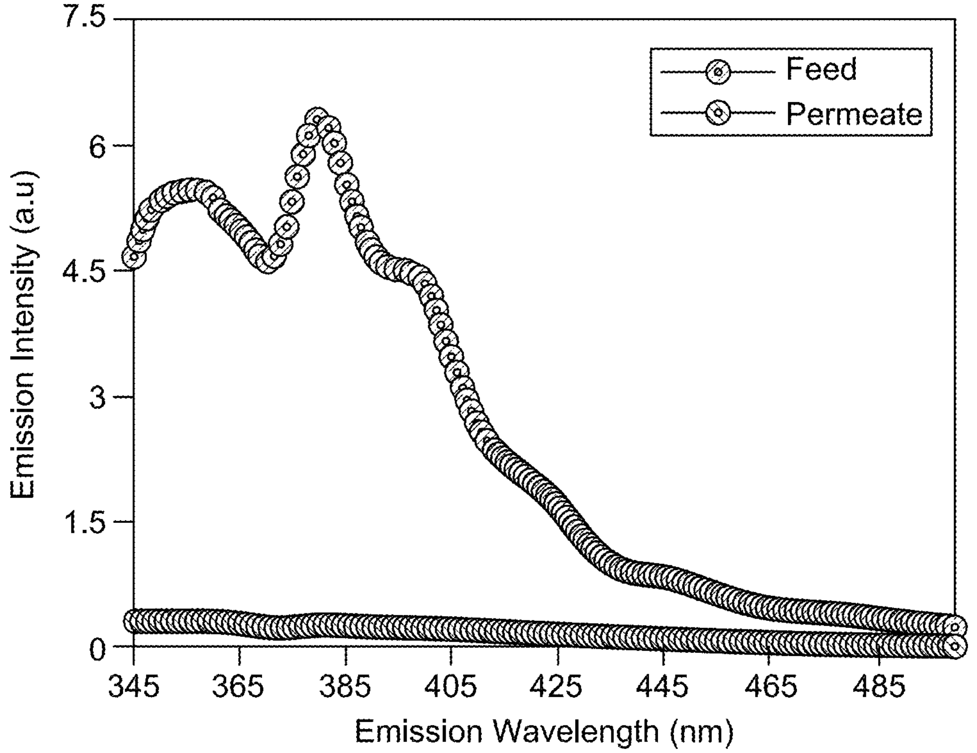
FIG. 11D is a PL spectrum of feed and permeate with 250 ppm O/W emulsion, according to certain embodiments.
Figure 12A:
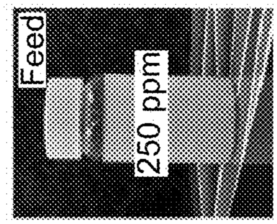
FIG. 12A, FIG. 12E, FIG. 12I, and FIG. 12M, show digital photographs of feed having 250 ppm, 125 ppm, 67.5 ppm, and 33.75 ppm O/W emulsion, respectively, according to certain embodiments.
Figure 12B:
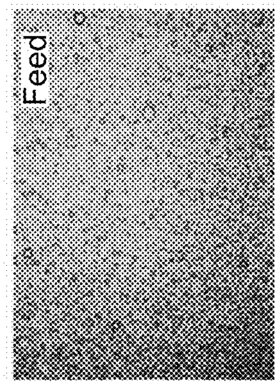
FIG. 12B, FIG. 12F, FIG. 12J, and FIG. 12N, show optical microscopic images of feed having 250 ppm, 125 ppm, 67.5 ppm, and 33.75 ppm O/W emulsion, respectively, according to certain embodiments.
Figure 12C:
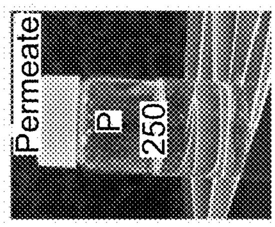
FIG. 12C, FIG. 12G, FIG. 12K, and FIG. 12O, show digital photographs of permeate having 250 ppm, 125 ppm, 67.5 ppm, and 33.75 ppm O/W emulsion, respectively, according to certain embodiments.
Figure 12D:
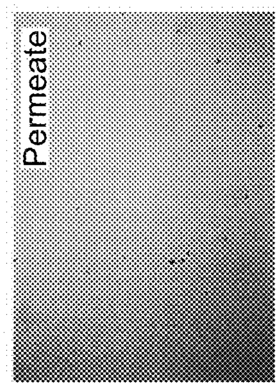
FIG. 12D, FIG. 12H, FIG. 12L, and FIG. 12P, show optical microscopic images of feed having 250 ppm, 125 ppm, 67.5 ppm, and 33.75 ppm O/W emulsion, respectively, according to certain embodiments.
Figure 12E:
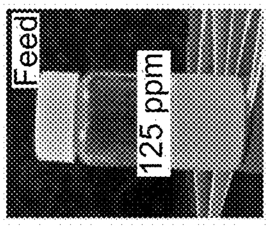
Figure 12F:
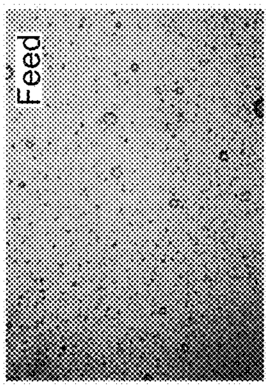
Figure 12G:
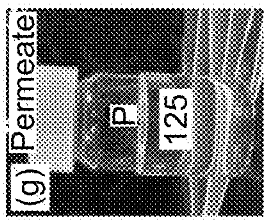
Figure 12H:
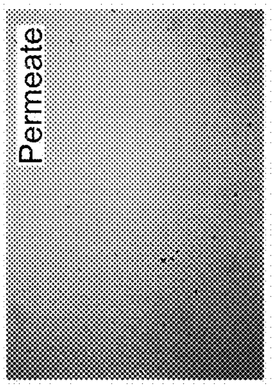
Figure 12I:
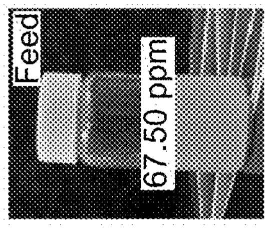
Figure 12J:
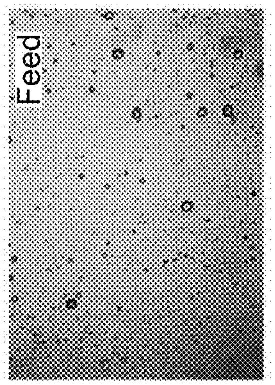
Figure 12K:
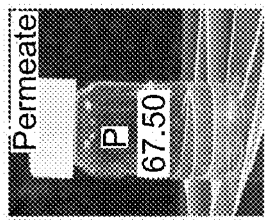
Figure 12L:
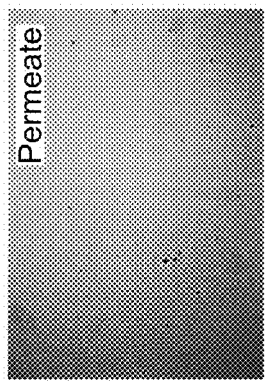
Figure 12M:
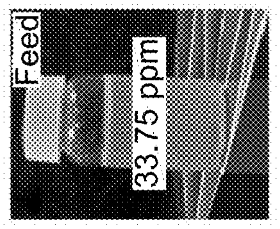
Figure 12N:
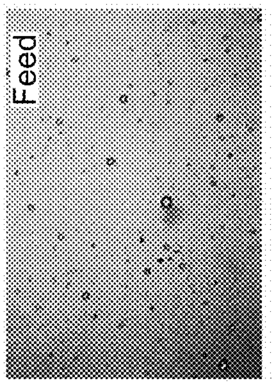
Figure 12O:
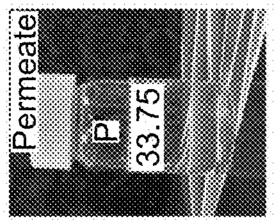
Figure 12P:
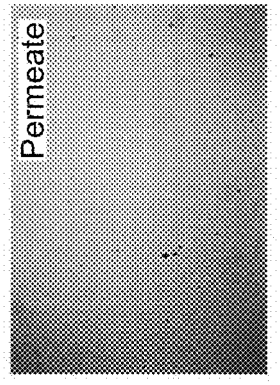

FIG. 10 depicts the effect of different concentrations of O/W emulsions and time on separation efficiency (%) with the $SiO_2$@SiC/PA@$Al_2O_3$ ceramic membrane. The separation efficiency of $SiO_2$@SiC/PA@$Al_2O_3$ ceramic membrane has been observed to stay >98% for all of the tested O/W emulsions. The effect of increasing O/W emulsion concentration was also studied, where a slight decline in separation efficiency of the $SiO_2$@SiC/PA@$Al_2O_3$ ceramic membrane was observed (FIG. 10A). Long-term stability test of separation efficiency of $SiO_2$@SiC/PA@$Al_2O_3$ ceramic membrane was studied to reveal the performance of the membrane for a period of 420 minutes. It was found that the membrane showed a stable performance of >98% separation efficiency of 125 ppm O/W emulsion (FIG. 10B).

FIGS. 11A-11D depict the photoluminescence (PL) spectrum of feed and permeate at various concentrations, namely: a) 33.75, (b) 67.50, (c) 125, and (d) 250 ppm O/W emulsion, respectively. Evidence of separation of O/W emulsion was obtained by measuring the PL of feeds and permeates obtained during filtration experiments. As shown in FIG. 11A-11D, an emission band was observed at 385 nm for all the studied feed concentrations of O/W emulsions. However, in the case of permeates, the emission band at 385 nm was reduced for all tested feeds. This emission band was due to the presence of aromatic and polyaromatic hydrocarbons present in the feed.

FIGS. 12A, 12E, 12I, and 12M depict digital photographs of feed at various concentrations, 33.75, 67.50, 125, and 250 ppm O/W emulsion, respectively; while FIGS. 12C, 12G, 12K, and 12O, respectively. The optical microscopic images of feed at various concentrations, 33.75, 67.50, 125, and 250 ppm O/W emulsion, are depicted in FIGS. 12B, 12F, 12J, and 12N, respectively; while the optical microscopic images of permeate at various concentrations, 33.75, 67.50, 125, and 250 ppm O/W emulsion, are depicted in FIGS. 12D, 12H, 12L, and 12P, respectively. The presence of oil droplets increases with increasing oil concentration in O/W emulsions. The highest oil concentration of droplets was found at 250 ppm, which decreased as the feed concentration reached 33.8 ppm. The feeds appeared milky and cloudy, while permeate was clear of cloudiness and appeared clean of oil. This observation was justified by recording optical micrographs of feeds and permeates. The optical micrographic images of permeates did not show any evidence of oil droplets which explains that the $SiO_2$@SiC/PA@$Al_2O_3$ ceramic membrane separated almost all of the oil from the feed.

Figure 13:
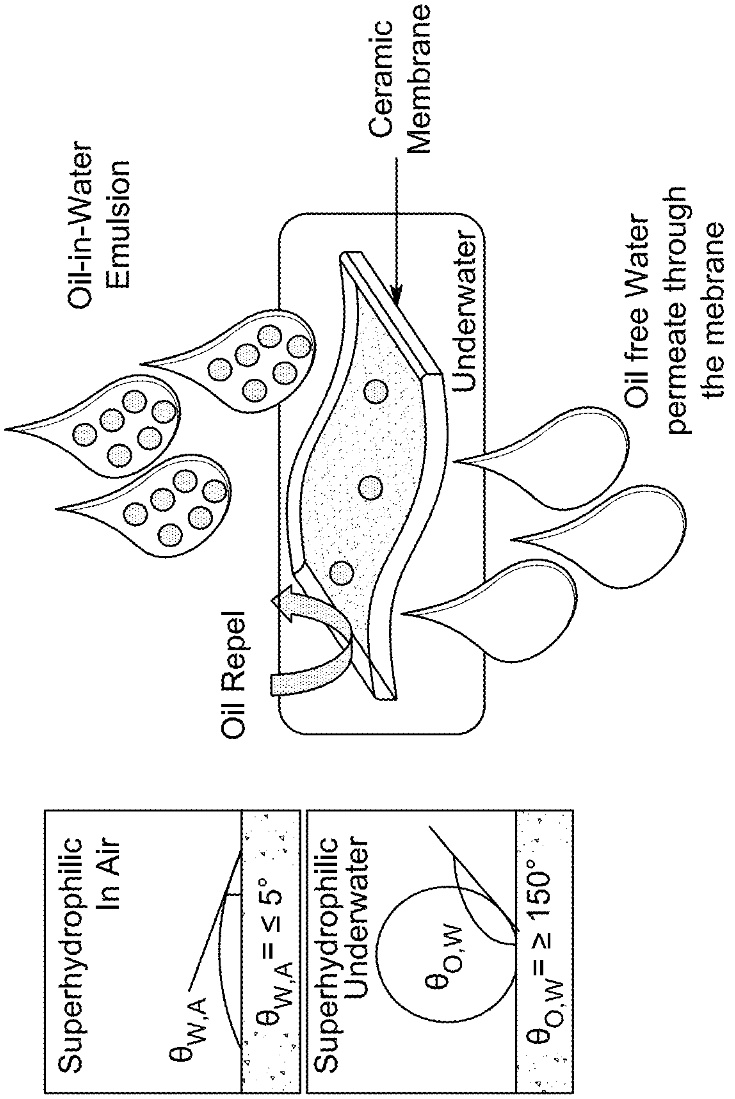
FIG. 13 is a schematic representation of the O/W emulsion separation mechanism with the superhydrophilic and underwater superoleophobic $SiO_2$@SiC/PA@$Al_2O_3$ ceramic membrane, according to certain embodiments.

The current design of $SiO_2$@SiC/PA@$Al_2O_3$ ceramic membrane proved to be efficient for the separation of surfactant stabilized O/W emulsion. It has been observed through the characterization of $SiO_2$@SiC/PA@$Al_2O_3$ ceramic membrane that membrane possesses underwater superoleophobic surface wettability where a membrane has a water-in-air contact angle of ≤5° and oil-in-water contact angle of ≥150°. Due to the special surface wettability of being underwater superoleophobic, the membrane was able to reject oil while allowing only water to permeate through the membrane [Baig, U., Faizan, M., Dastageer, M. A., 2021. Polyimide based super-wettable membranes/materials for high performance oil/water mixture and emulsion separation: A review. Adv. Colloid Interface Sci. 297, 102525; and Baig, U., Faizan, M., Sajid, M., 2020, Multifunctional membranes with super-wetting characteristics for oil-water separation and removal of hazardous environmental pollutants from water: A review. Adv. Colloid Interface Sci. 285, 102276, each of which is incorporated herein by reference in their entirety]. Another feature of having an underwater superoleophobic nature was a lower fouling tendency of the $SiO_2$@SiC/PA@$Al_2O_3$ ceramic membrane. Due to the underwater superoleophobic nature, the membrane does not allow the oil to develop considerable interactions with the membrane surface, which lead to a greater value of oil in water contact angle (FIG. 13).

To conclude, a $SiO_2$@SiC/PA@$Al_2O_3$ ceramic membrane was fabricated by covalently decorating SiC as an active layer on alumina support for treating a surfactant-stabilized O/W emulsion. An amino functionalized $NH_2$—$SiO_2$@SiC was synthesized and deposited on alumina support through IP reaction with TPC. The structure, surface wettability, surface morphology, and elemental analysis of the fabricated $SiO_2$@SiC/PA@$Al_2O_3$ ceramic membrane were confirmed by ATR-FTIR, PXRD, goniometry, SEM, EDX, and elemental mapping analysis. The resultant membrane showed an in-air superhydrophilic and underwater superoleophobic surface with a water contact angle of ≤5° (in-air) and an oil contact angle of ≥150° (underwater). The $SiO_2$@SiC/PA@$Al_2O_3$ ceramic membrane was applied to separate the O/W emulsion, and the membrane could separate an O/W emulsion of 250 ppm feed. The membrane showed a separation efficiency of >98% for an emulsion of 125 ppm at 2 bar transmembrane pressure. The method described in this disclosure for fabricating ceramic membranes has been shown to be effective in treating oily wastewater.

Numerous modifications and variations of the present disclosure are possible in light of the above teachings. It is therefore to be understood that within the scope of the appended claims, the invention may be practiced otherwise than as specifically described herein.

The invention claimed is:

1. A method of making a ceramic membrane comprising an alumina ($Al_2O_3$) layer, a polyamide nanocomposite layer at least partially covering a surface of the alumina layer, wherein the polyamide nanocomposite layer comprises polyamide-functionalized silicon carbide (SiC) nanoparticles having an average particle size of 0.1 to 1 micrometer (μm), wherein the polyamide-functionalized SiC nanoparticles comprise an amine-functionalized SiC moiety, an acyl aryl, and a piperazine moiety, wherein the amine-functionalized SiC moiety comprises a SiC core and an amine functionalized silicon dioxide ($SiO_2$) shell covering the SiC core, wherein the amine-functionalized SiC moiety is covalently bonded to the piperazine moiety via the acyl aryl moiety, and wherein the amine functionalized $SiO_2$ shell comprises at least one amino group containing structural unit that is covalently bonded to the $SiO_2$ shell, the method comprising:

calcining silicon carbide particles at a temperature of 600 to 800 degree Celsius (° C.) in the presence of oxygen to form a first composite having a silicon carbide core surrounded by a silicon dioxide shell;

dispersing the first composite in an alcohol solvent and mixing with an aminosilane compound to form a second composite;

washing the second composite and drying to form an amine-functionalized silicon carbide composite;

mixing the amine-functionalized silicon carbide composite and a piperazine-containing solution to form a dispersion;

dipping the alumina layer into a surfactant solution to form a treated alumina layer;

passing the dispersion through the treated alumina layer to from form an impregnated alumina layer containing the amine-functionalized silicon carbide composite particles and piperazine molecules; and dipping the impregnated alumina layer in an acyl aryl chloride solution and reacting to form the polyamide nanocomposite layer covering the surface of the alumina layer thereby forming the ceramic membrane.

2. The method of claim 1, wherein the alcohol solvent comprises at least one of isopropanol, ethanol, and methanol.

3. The method of claim 1, wherein the aminosilane compound comprises at least one of N-(6-aminohexyl)aminomethyltriethoxysilane, bis(3-triethoxysilylpropyl)amine, 3-aminopropyl(diethoxy)methylsilane, 3-Aminopropyltrimethoxysilane (APTMS), and 3-aminopropyltriethoxysilane (APTES).

4. The method of claim 1, wherein the first composite is present in the alcohol solvent at a concentration of 5 to 20 milligrams per milliliter (mg/mL).

5. The method of claim 1, wherein the aminosilane compound is present in the alcohol solvent at a concentration of 1 to 10 vol. % based on a total volume of the alcohol solvent.

6. The method of claim 1, wherein the amine-functionalized silicon carbide composite has an average particle size in a range of 20 to 600 nm.

7. The method of claim 1, wherein the amine-functionalized silicon carbide is present in the dispersion at a concentration of 0.01 to 0.5 g/mL based on a total volume of the dispersion.

8. The method of claim 1, wherein the piperazine is present in the piperazine-containing solution at a concentration of 0.5 to 5 g/mL based on a total volume of the piperazine-containing solution.

9. The method of claim 1, wherein the surfactant solution comprises at least one surfactant selected from the group consisting of sodium dodecyl sulfate (SDS), sorbitan monolaurate, and dodecyltrimethylammonium bromide.

10. The method of claim 1, wherein the treated alumina layer formed the surfactant solution is placed on a support disc in a dead end filtration cell;

wherein the dead end filtration cell is in the shape of a vertical cylinder having a gas inlet, a permeate outlet, a top portion, a body portion, and a bottom portion;

wherein the gas inlet is located on the outer surface of the top portion;

wherein the permeate outlet is located on the outer surface of the bottom portion;

wherein the top portion is in fluid communication with the bottom portion via the body portion of the dead end filtration cell;

wherein the bottom portion comprises the support disc and a cell bottom; and wherein the support disc is above and adjacent to the cell bottom.

11. The method of claim 1, wherein the acyl aryl chloride is present in the acyl aryl chloride solution at a concentration of 0.05 to 0.5 g/mL based on a total volume of the acyl aryl chloride solution.

12. The method of claim 1, wherein the acyl aryl chloride comprises at least one selected from the group consisting of terephthaloyl chloride, phthaloyl dichloride, and isophthaloyl dichloride.

* * * * *